United States Patent [19]
Kubo et al.

[11] Patent Number: 5,773,109
[45] Date of Patent: Jun. 30, 1998

US005773109A

[54] HOLLOW, RESIN MECHANICAL PART HAVING A SHAFT INTEGRALLY FORMED THEREWITH AND AN INJECTION MOLDING METHOD FOR PRODUCING THE SAME

[75] Inventors: Kimihiro Kubo, Yokohama; Masahiko Sato; Masaaki Kondo, both of Kawasaki, all of Japan

[73] Assignee: Asahi Kasei Kogyo Kabushiki Kaisha, Osaka, Japan

[21] Appl. No.: 663,185

[22] PCT Filed: Dec. 28, 1994

[86] PCT No.: PCT/JP94/02289

§ 371 Date: Jun. 13, 1996

§ 102(e) Date: Jun. 13, 1996

[87] PCT Pub. No.: WO95/28275

PCT Pub. Date: Oct. 26, 1995

[30] Foreign Application Priority Data

Apr. 14, 1994 [JP] Japan .................................. 6-075743

[51] Int. Cl.[6] .......................... B29C 45/00; B29C 49/06
[52] U.S. Cl. .................... 428/36.9; 264/572; 264/328.8; 264/328.12
[58] Field of Search .............................. 264/572, 328.8, 264/328.12; 428/36.9

[56] References Cited

U.S. PATENT DOCUMENTS

| | | | |
|---|---|---|---|
| 5,028,377 | 7/1991 | Hendry | 264/572 |
| 5,173,241 | 12/1992 | Shibuya et al. | 264/572 |
| 5,612,067 | 3/1997 | Kurihara et al. | 425/533 |

FOREIGN PATENT DOCUMENTS

| | | |
|---|---|---|
| 3835964 | 4/1990 | Germany . |
| 56-42532 | 10/1981 | Japan . |
| 5-208460 | 8/1993 | Japan . |
| 6-064024 | 3/1994 | Japan . |

*Primary Examiner*—Mary Lynn Theisen
*Attorney, Agent, or Firm*—Birch, Stewart, Kolasch & Birch, LLP

[57] ABSTRACT

Disclosed is a hollow, resin mechanical part having a shaft integrally formed therewith, comprising a hollow, integral, functional segment-shaft structure comprising at least one functional resin segment, and a resin shaft coaxially, integrally formed with the functional segment, wherein the integral segment-shaft structure satisfies the relationships defined by the following formula $0.9 \leq L(b)/L(a) \leq 1$, in which $L(a)$ represents the entire length of the integral segment-shaft structure, and $L(b)$ represents the length of the hollow. The mechanical part of the present invention has not only high dimensional precision and excellent material-recycling characteristics, but also can be produced with high productivity, and is very useful in various fields, such as automobiles, ordinary machinery, precision machinery and electric and electronic equipment. Also disclosed is a hollow injection molding method for efficiently producing this mechanical part, comprising injecting a molten resin into a mold cavity through the gate to form a molten resin mass, and introducing a hollow-forming fluid under pressure into the molten resin mass through the gate, wherein the gate is located in register with a position within a terminal region of the cavity which region has a length of $\frac{1}{10}$ of the entire length of an integral segment-shaft structure to be produce. In this method, an auxiliary chamber communicated with the cavity is preferably used.

24 Claims, 11 Drawing Sheets

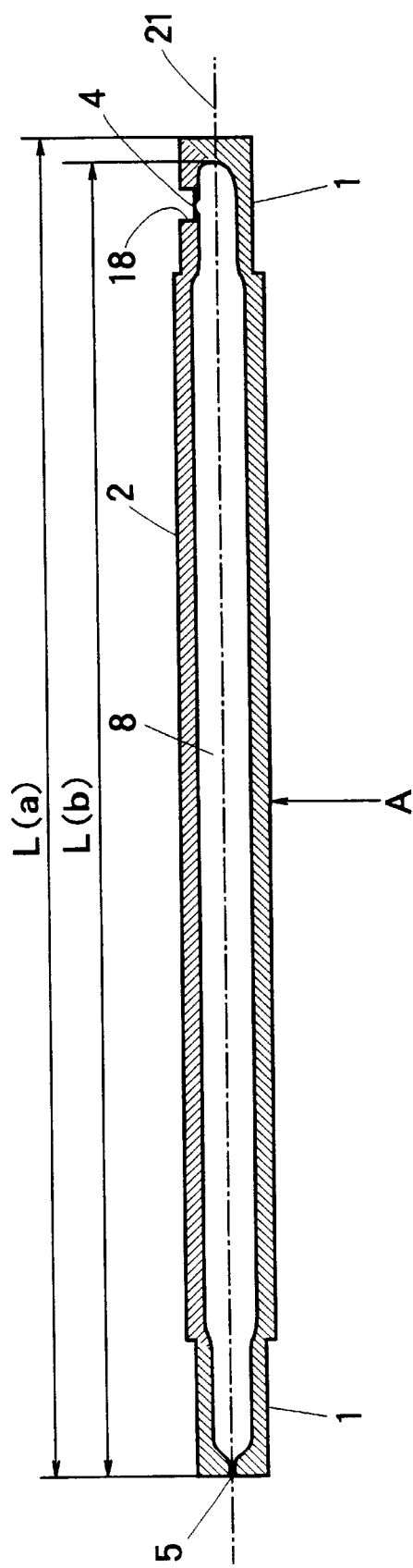
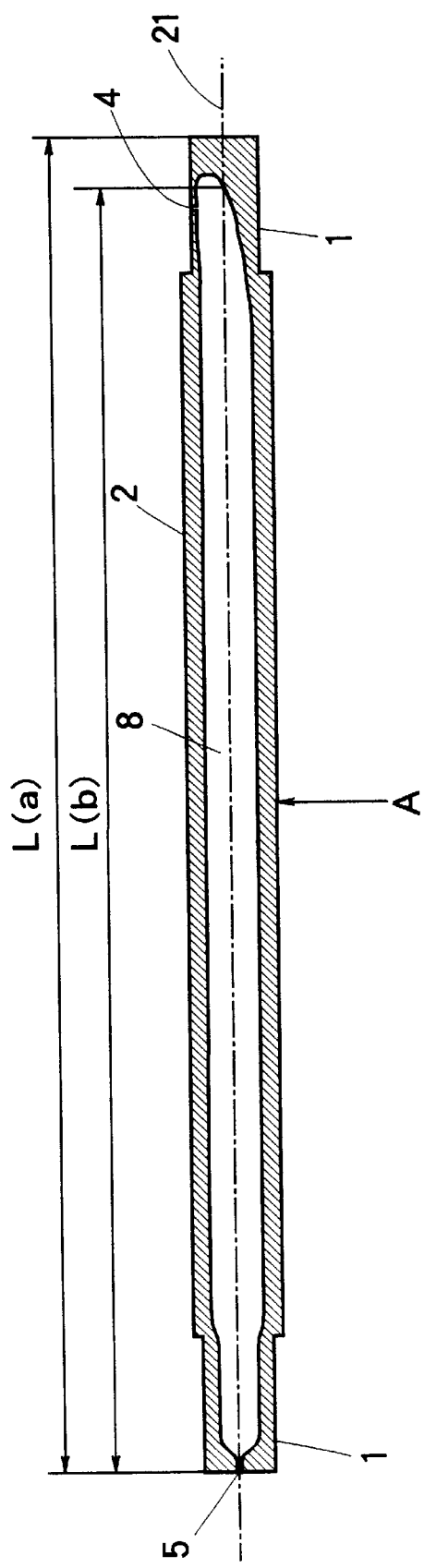

HOLLOW, RESIN MECHANICAL PART HAVING A SHAFT INTEGRALLY FORMED THEREWITH AND AN INJECTION MOLDING METHOD FOR PRODUCING THE SAME

BACKGROUND OF THE INVENTION

1. Field of the Invention

The present invention relates to a hollow, resin mechanical part having a shaft integrally formed therewith. More particularly, the present invention is concerned with a hollow, resin mechanical part having a shaft integrally formed therewith, comprising a hollow, integral, functional segment-shaft structure comprising at least one functional resin segment, and a resin shaft coaxially, integrally formed with the functional segment, wherein the hollow of the hollow, integral segment-shaft structure has a relatively large specific length ratio relative to the entire length of the integral segment-shaft structure. The mechanical part of the present invention has not only high dimensional precision and excellent material-recycling characteristics, but also can be produced with high productivity. The present invention is also a concerned with an injection molding method for producing this mechanical part.

2. Discussion of Related Art

Mechanical parts having a shaft unitarily formed therewith are widely used in various fields, such as automobiles, ordinary machinery, precision machinery and electric and electronic equipment.

In general, a resin mechanical part having a shaft unitarily formed therewith is produced by (1) an insert molding method in which a metallic shaft is used, (2) a method in which a mechanical part is carved out of a resin mass, or (3) a hollow injection molding method.

At the outset, method (1) mentioned above is explained. A molten resin undergoes shrinkage upon cooling. Therefore, when a non-hollow, resin mechanical part having a shaft integrally formed therewith is produced by injection molding, the resin thickness inevitably becomes large and, therefore, the shrinkage of the resin should also become large, so that the resin mechanical part becomes poor in dimensional precision. The dimensional precision of a mechanical part is usually expressed in terms of the coaxiality and the degree of "run out". When the mechanical part is a toothed wheel (gear), the dimensional precision also includes the dimensional precision of teeth, and when the mechanical part is a roller, the dimensional precision also includes cylindricality. When a non-hollow, resin mechanical part having a shaft integrally formed therewith is produced by injection molding, there is also a disadvantage in that the time required for solidifying the molten resin is prolonged due to the large resin thickness, so that the cycle time of molding is prolonged, leading to a low productivity. For solving the above problems, method (1) mentioned above, i.e., an insert molding method using a metallic shaft was proposed in which an increase in the resin thickness can be avoided.

Method (2) mentioned above, in which a mechanical part having a shaft integrally formed therewith is carved out of a resin rod or the like, is advantageous in that there is no problem of shrinkage of the resin and a mechanical part having a good dimensional precision can be obtained.

Examples of method (3) mentioned above, in which a mechanical part having a shaft integrally formed therewith is produced by hollow injection molding, are disclosed in Unexamined Japanese Patent Application Laid-Open Specification No. 5-208460 and DE Publication No. 3835964. In each of these publications, a molten resin is injected into a mold cavity to form a molten resin mass in a manner such that a space substantially non-filled with the molten resin mass remains in the cavity, and, subsequently, a gas is introduced into the molten resin mass to form a hollow within the molten resin mass, thereby forming a shaped, hollow resin article. This method was proposed so as to simplify the process for producing a roller having a shaft integrally formed therewith and to achieve lightness in the weight of a mechanical part (and also to improve economy due to a decrease in the amount of a resin to be used).

However, method (1) mentioned above is disadvantageous in that it is necessary to involve an additional step in which a metallic shaft is set in a mold cavity in order to insert it in the resin and, therefore, productivity becomes low, as compared to a hollow injection molding not involving the step of inserting a metallic shaft. Further, in respect of environmental protection which is a social problem recently drawing attention, method (1) has problems in that a mechanical part produced by this method is a unified structure comprised of a metal and a resin, so that it is difficult to separate the resin from the metal and, therefore, it is difficult to recycle these materials.

Method (2) which involves a cutting operation, is disadvantageous in that a long time and a large amount of work are needed, so that productivity is poor, as compared to the injection molding method.

The method disclosed in Unexamined Japanese Patent Application Laid-Open Specification No. 5-208460 and DE Publication No. 3835964, which is method (3), is disadvantageous in that the length L(b) of a hollow as measured along a long axis of the hollow resin structure is small relative to the entire length L(a) of the hollow resin structure, so that during the molding, the molten resin mass has a portion where the pressurizing effect of a hollow-forming gas cannot be exerted and this portion becomes poor in dimensional precision. Specifically, in the hollow resin structure disclosed in Unexamined Japanese Patent Application Laid-Open Specification No. 5-208460, a portion of the toothed wheel and a portion of the shaft, which portions each are located at one of the terminal regions of the hollow resin structure opposite to the other terminal region thereof having an opening corresponding to the gate of the mold employed, have no hollow extending therein, and the hollow resin structure has an L(b)/L(a) of only about 0.8. Likewise, in DE Publication No. 3835964, portions of the shaft which are located at both longitudinal ends of the hollow resin structure have no hollow extending therein, and the hollow resin structure has an L(b)/L(a) of only about 0.67. The techniques of these publications have serious defects in that the portions of the resin having no hollow extending therein are unlikely to receive the pressurizing effect of a hollow-forming fluid during the molding, so that the reproduction of the cavity wall on a hollow resin structure to be produced becomes poor and the dimensional precision is lowered. When a mechanical part having a shaft integrally formed therewith has poor dimensional precision even at its local portion, such as a toothed wheel, a shaft or the like, the function of the mechanical part as a whole is adversely affected. For example, with respect to a mechanical part having a shaft integrally formed therewith, even when only a portion of the shaft which is located at one end of the mechanical part is poor in dimensional precision, there is a serious problem that when the mechanical part is revolved on an axis of the shaft, the entire mechanical part exhibits a large, non-coaxial run-out movement.

Further, in either of these publications, a molten resin is injected into a mold cavity to form a molten resin mass in a manner such that a space substantially non-filled with the molten resin mass remains in the cavity, and, subsequently, a gas is introduced into the molten resin mass to form a hollow within the molten resin mass, thereby forming a shaped, hollow resin article. However, a shaped, hollow resin article produced by this method is likely to have on its surface an annularly extending area of tiny concaves and convexes, which is called a "hesitation mark", so that, in some cases, the appearance and dimensional precision become less satisfactory. The hesitation mark is a local defect and may not cause a problem depending on the morphology of the hollow resin article. However, it is desired that a hollow resin article not have a hesitation mark. Based on the knowledge of the present inventors, the present inventors have made the following presumption with respect to the cause of the occurrence of a hesitation mark. The cause of the hesitation mark resides in that when a molten resin is injected into a mold cavity to form a molten resin mass in a manner such that a space non-filled with the molten resin mass remains in the cavity, the flowing and spreading of the molten resin so as to contact the entire region of the cavity wall are temporarily stopped until a gas is introduced into the molten resin mass to form a hollow within the molten resin mass. More specifically, when a molten resin is injected into a mold cavity, the molten resin immediately starts to solidify by cooling. However, when the flowing and spreading of the molten resin are temporarily stopped in the cavity as described above, the contacting of the entire region of the cavity wall with the molten resin cannot be rapidly achieved, resulting in the occurrence of both a portion of the resin which contacts the cavity wall in the early stage and a portion of the resin which contacts the cavity wall in the later stage. The hesitation mark occurs at the boundary between both portions of the resin which are different in the timing of contacting the cavity wall.

As apparent from the above, the conventional methods have various problems, namely, low productivity, poor material-recycling characteristics, low dimensional precision and occurrence of a hesitation mark.

SUMMARY OF THE INVENTION

The present inventors have made extensive and intensive studies with a view toward solving the above-mentioned difficult problems of the prior art. As a result, it has unexpectedly been found that in a hollow, resin mechanical part having a shaft integrally formed therewith which is produced by subjecting a resin to hollow injection molding and comprising a hollow resin structure adapted to be supported by bearing means at the shaft and revolved on the axis of the shaft to thereby exert a function of the hollow resin structure, when the hollow of the hollow resin structure satisfies the relationships defined by the following formula (1):

$$0.9 < L(b)/L(a) \leq 1 \quad (1)$$

wherein L(a) represents the entire length of the hollow resin structure as measured along the axis thereof, and L(b) represents the length of the hollow as measured along the axis of the hollow resin structure, not only does the mechanical part have high dimensional precision, but also it can be produced with high productivity. The present invention has been completed, based on this novel finding.

It is, accordingly, an object of the present invention to provide a hollow, resin mechanical part having a shaft integrally formed therewith which has not only high dimensional precision but also excellent material-recycling characteristics, and which can be produced with high productivity.

It is another object of the present invention to provide a hollow injection molding method for producing the above excellent hollow, resin mechanical part having a shaft integrally formed therewith.

It is a further object of the present invention to provide a hollow injection molding method for producing the above excellent hollow, resin mechanical part having a shaft integrally formed therewith, wherein the hollow of the hollow resin structure continuously extends substantially along the axis of the hollow resin structure, and the hollow resin structure has no hesitation mark.

The foregoing and other objects, features and advantages will be apparent to those skilled in the art from the following detailed description and claims taken in connection with the accompanying drawings.

BRIEF DESCRIPTION OF THE DRAWINGS

In the accompanying drawings:

FIG. 6(a) is a diagrammatic cross-sectional view of the roller having a shaft integrally formed therewith of FIG. 3, taken along a vertical plane containing the axis of the roller;

FIG. 6(b) is a diagrammatic cross-sectional view of another form of a roller having a shaft integrally formed therewith according to the present invention, taken along a vertical plane containing the axis of the roller;

FIG. 15 is a diagrammatic cross-sectional view of a further form of a roller having a shaft integrally formed therewith according to the present invention, taken along a vertical plane containing the axis of the roller;

FIG. 16 is a diagrammatic cross-sectional view of a further form of a roller having a shaft integrally formed therewith according to the present invention, taken along a vertical plane containing the axis of the roller;

FIG. 20(a) is a diagrammatic explanatory view illustrating how one mode of the hollow injection molding method according to the present invention is practiced, showing portions around the gate;

FIG. 20(b) is a diagrammatic plan view showing recess 18 of the mold cavity of FIG. 20(a), as viewed from just above recess 18, with runner 20 of FIG. 20(a) being omitted;

FIG. 21(a) is a diagrammatic explanatory view illustrating how another mode of the hollow injection molding method according to the present invention is practiced, showing portions around the gate;

FIG. 21(b) is a diagrammatic plan view showing recess 18 of the mold cavity of FIG. 21(a), as viewed from just above recess 18, with runner 20 of FIG. 21(a) being omitted;

In FIG. 1 through FIG. 23, like parts or portions are designated by like numerals and characters. In FIG. 1 through FIG. 23, the reference numerals designate the following parts and portions.

Figure 1:
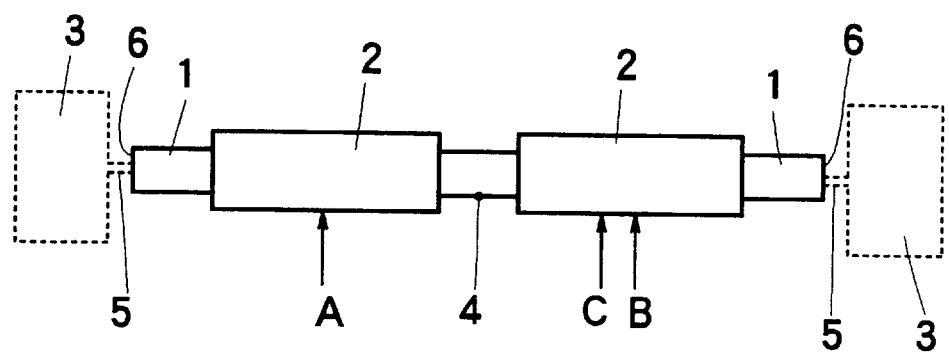
FIG. 1 is a diagrammatic side view of one form of a roller having a shaft integrally formed therewith produced by a method which is similar to but undesirably different from the method of the present invention.

1: Shaft
2: Roller
3: Auxiliary chamber used in the production of a mechanical part having a shaft integrally formed therewith
4: Opening corresponding to a gate or a portion corresponding to the gate
5: Path for communicating the cavity with an auxiliary chamber or an opening of the integral segment-shaft structure which corresponds to the path
6: End surface
7: Toothed wheel
8: Hollow
9: Tip of a tooth of a toothed wheel
10: Root of teeth of a toothed wheel
11: Tooth
12: Tip circle
13: Root circle
14: Groove
15: Inlet for a hollow-forming fluid
16: Dial gauge
17: V block
18: Recess
19: Hollow, integral, functional segment-shaft structure
20: Runner
21: Axis of a hollow, integral, functional segment-shaft structure

DETAILED DESCRIPTION OF THE INVENTION

In one aspect of the present invention, there is provided a hollow, resin mechanical part having a shaft integrally formed therewith, comprising a hollow, integral, functional segment-shaft structure, the hollow, integral, functional segment-shaft structure comprising at least one functional resin segment, and a resin shaft coaxially, integrally formed with the functional segment, the hollow, integral, functional segment-shaft structure having a hollow continuously or discontinuously extending substantially along an axis of the segment-shaft structure within at least one member selected from the functional segment and the shaft, the hollow, integral, functional segment-shaft structure having, in an outer surface thereof, one or two openings communicating with the hollow, wherein the hollow, integral, functional segment-shaft structure satisfies the relationships defined by the following formula (1):

$$0.9 \leq L(b)/L(a) \leq 1 \quad (1)$$

wherein L(a) represents the entire length of the integral segment-shaft structure as measured along the axis thereof, and L(b) represents the length of the hollow as measured along the axis of the integral segment-shaft structure, the hollow, integral, functional segment-shaft structure being adapted to be supported by bearing means at the shaft and revolved on the axis of the shaft to thereby exert a function of the functional segment.

In another aspect of the present invention, there is provided a method for injection molding a resin while forming a hollow to produce the above-mentioned hollow, resin mechanical part having a shaft integrally formed therewith, which comprises:

(1) providing a mold comprising a fixed mold half and a movable mold half mating with the fixed mold half to thereby provide a mold cavity defined by an inner wall of the fixed mold half and an inner wall of the movable mold half, the mold cavity being communicated with a gate, (2) injecting a resin in a molten form into the cavity through the gate to form a molten resin mass in the cavity, and (3) introducing a hollow-forming fluid under pressure into the molten resin mass through the gate to form a hollow within the molten resin mass, wherein the gate is located in register with a position within a terminal region of the cavity which region has a length of 1/10 of the entire length of a hollow, integral, functional segment-shaft structure to be produced as measured along an axis thereof, so that the hollow, integral segment-shaft structure satisfies the relationships defined by the following formula (1):

$$0.9 \leq L(b)/L(a) \leq 1 \qquad (1)$$

wherein L(a) represents the entire length of the integral segment-shaft structure as measured along the axis thereof, and L(b) represents the length of the hollow as measured along the axis of the integral segment-shaft structure.

According to a preferred embodiment of the method of the present invention as defined above, the mold has an auxiliary chamber communicated with the mold cavity, and, in step (2), the molten resin is injected so as to fill the cavity and, in step (3), the introduction of the hollow-forming fluid into the molten resin mass is conducted while causing a portion of the resin mass to be pushed out of the cavity into the auxiliary chamber under the pressure of the introduced hollow-forming fluid.

For easy understanding of the present invention, various embodiments of the present invention are enumerated below.

1. A hollow, resin mechanical part having a shaft integrally formed therewith, comprising a hollow, integral, functional segment-shaft structure, the hollow, integral, functional segment-shaft structure comprising at least one functional resin segment, and a resin shaft coaxially, integrally formed with the functional segment, the hollow, integral, functional segment-shaft structure having a hollow continuously or discontinuously extending substantially along an axis of the segment-shaft structure within at least one member selected from the functional segment and the shaft, the hollow, integral, functional segment-shaft structure having, in an outer surface thereof, one or two openings communicating with the hollow, wherein the hollow, integral, functional segment-shaft structure satisfies the relationships defined by the following formula (1):

$$0.9 \leq L(b)/L(a) \leq 1 \qquad (1)$$

wherein L(a) represents the entire length of the integral segment-shaft structure as measured along the axis thereof, and L(b) represents the length of the hollow as measured along the axis of the integral segment-shaft structure, the hollow, integral, functional segment-shaft structure being adapted to be supported by bearing means at the shaft and revolved on the axis of the shaft to thereby exert a function of the functional segment.

2. The mechanical part according to item 1 above, wherein the integral segment-shaft structure has, in an outer surface thereof, two openings communicating with the hollow, and the two openings are, respectively, located in two opposite end surfaces of the integral segment-shaft structure, the two opposite end surfaces being separated by a distance equal to the length of the axis of the integral segment-shaft structure, and wherein the integral segment-shaft structure satisfies the relationships defined by the formula L(b)/L(a)=1 wherein L(a) and L(b) are as defined for formula (1).

3. The mechanical part according to item 1 above, wherein the integral segment-shaft structure has, in an outer surface thereof, two openings communicating with the hollow, and wherein one of the two openings is located in one of two opposite end surfaces of the integral segment-shaft structure, the two opposite end surfaces being separated by a distance equal to the length of the axis of the integral segment-shaft structure, and the other opening is located in a recess formed in an outer surface portion other than the two opposite end surfaces, the recess being concaved in a direction from the outer surface portion toward the axis of the integral segment-shaft structure.

4. The mechanical part according to item 1 above, wherein at least a part of the functional segment constitutes a toothed wheel (gear).

5. The mechanical part according to item 1 above, wherein at least a part of the functional segment constitutes a toothed wheel (gear) coaxially formed with the shaft, and wherein the toothed wheel satisfies the relationships represented by the formula R1/r1=1 to 5, in which R1 represents the diameter of the root circle of the toothed wheel and r1 represents the diameter of the shaft.

6. The mechanical part according to item 1 above, wherein at least a part of the functional segment constitutes a roller.

7. The mechanical part according to item 1 above, wherein at least a part of the functional segment constitutes a roller coaxially formed with the shaft, and wherein the roller satisfies the relationships represented by the formula R2/r2=1 to 4, in which R2 represents the diameter of the roller and r2 represents the diameter of the shaft.

8. The mechanical part according to item 1 above, wherein at least a part of the functional segment constitutes a roller coaxially formed with the shaft, wherein the roller has on a surface thereof a groove having a depth of not smaller than a width of the groove, and wherein the roller satisfies the relationships represented by the formula r3/R3$\geq$0.5, in which r3 represents the distance between the inner bottom of the groove and the axis of the integral segment-shaft structure, and R3 represents the radius of the circular cross section of the roller at a portion thereof having no groove.

9. A method for injection molding a resin while forming a hollow to produce a hollow, resin mechanical part having a shaft integrally formed therewith according to item 1 above, which comprises:

(1) providing a mold comprising a fixed mold half and a movable mold half mating with the fixed mold half to thereby provide a mold cavity defined by an inner wall surface of the fixed mold half and an inner wall surface of the movable mold half, the mold cavity being communicated with a gate, (2) injecting a resin in a molten form into the cavity through the gate to form a molten resin mass in the cavity, and (3) introducing a hollow-forming fluid under pressure into the molten resin mass through a gate for the mold cavity to form a hollow within the molten resin mass, wherein the gate is located in register with a position within a terminal region of the cavity which region has a length of 1/10 of the entire length of a hollow, integral, functional segment-shaft structure to be produced as measured along an axis thereof, so that the hollow, integral segment-shaft structure satisfies the relationships defined by the following formula (1):

$$0.9 \leq L(b)/L(a) \leq 1 \quad (1)$$

wherein L(a) represents the entire length of the integral segment-shaft structure as measured along the axis thereof, and L(b) represents the length of the hollow as measured along the axis of the integral segment-shaft structure.

10. The method according to item 9 above, wherein the mold has an auxiliary chamber communicated with the mold cavity, and wherein, in step (2), the molten resin is injected so as to fill the cavity and, in step (3), the introduction of the hollow-forming fluid into the molten resin mass is conducted while causing a portion of the resin mass to be pushed out of the cavity into the auxiliary chamber under the pressure of the introduced hollow-forming fluid.

11. The method according to item 10 above, wherein the auxiliary chamber is communicated with the mold cavity through an opening formed in one of two opposite end walls of the cavity, the two opposite end walls being separated by a distance equal to the length of an axis of the cavity which axis corresponds to the axis of the integral segment-shaft structure to be produced, the one end wall being positioned on a side remote from the gate.

12. The method according to item 9 or 10 above, wherein a protrusion is formed in a wall of the mold defining the cavity, the protrusion corresponding to a recess which is to be formed in the integral segment-shaft structure at its outer surface portion other than the two opposite end surfaces separated by a distance equal to the length of the axis of the integral segment-shaft structure to be produced and which is to be concaved in a direction from the outer surface portion toward the axis of the integral segment-shaft structure, and wherein the gate is located in the protrusion in the wall defining the cavity and directed so that the molten resin is injected into the cavity in a direction perpendicular to an axis of the cavity which axis corresponds to the axis of the integral segment-shaft structure to be produced.

13. The method according to item 9 or 10 above, wherein the cavity has an internal morphology adapted for producing a hollow, integral, functional segment-shaft structure in which at least a part of the functional segment constitutes a toothed wheel (gear).

14. The method according to item 9 or 10 above, wherein the cavity has an internal morphology adapted for producing a hollow, integral, functional segment-shaft structure in which at least a part of the functional segment constitutes a toothed wheel (gear) coaxially formed with the shaft, wherein the toothed wheel satisfies the relationships represented by the formula $R1/r1=1$ to 5, in which R1 represents the diameter of the root circle of the toothed wheel and r1 represents the diameter of the shaft.

15. The method according to item 9 or 10 above, wherein the cavity has an internal morphology adapted for producing a hollow, integral, functional segment-shaft structure in which at least a part of the functional segment constitutes a roller.

16. The method according to item 9 or 10 above, wherein the cavity has an internal morphology adapted for producing a hollow, integral, functional segment-shaft structure in which at least a part of the functional segment constitutes a roller coaxially formed with the shaft, wherein the roller satisfies the relationships represented by the formula $R2/r2=1$ to 4, in which R2 represents the diameter of the roller and r2 represents the diameter of the shaft.

17. The method according to item 9 or 10 above, wherein the cavity has an internal morphology adapted for producing a hollow, integral, functional segment-shaft structure in which at least a part of the functional segment constitutes a roller coaxially formed with the shaft, wherein the roller has on a surface thereof a groove having a depth of not smaller than a width of the groove, and wherein the roller satisfies the relationships represented by the formula $r3/R3 \geq 0.5$, in which r3 represents the distance between the inner bottom of the groove and the axis of the integral segment-shaft structure, and R3 represents the radius of the circular cross section of the roller at a portion thereof having no groove.

Hereinafter, the present invention will be described in detail, with reference to the accompanying drawings.

As mentioned above, the hollow, resin mechanical part having a shaft integrally formed therewith according to the present invention comprises a hollow, integral, functional segment-shaft structure comprising at least one functional resin segment, and a resin shaft coaxially, integrally formed with the functional segment. The integral segment-shaft structure has a hollow continuously or discontinuously extending substantially along an axis of the segment-shaft structure within at least one member selected from the functional segment and the shaft. The integral segment-shaft structure has, in an outer surface thereof, one or two openings communicating with the hollow.

In the present invention, the term "mechanical part" means a part which exerts a function by revolution thereof on axis 21 so as to transmit force or movement or transport an object. Representative examples of mechanical parts include a toothed wheel device, a roller device, a runner device, a disc device, a cam device, a pulley device and a combination of these parts. In general, mechanical parts can be roughly classified into a type which has a hole for receiving a shaft and a type which has a shaft. In the former type of a mechanical part, a shaft (for example a metallic shaft) is inserted into the shaft-receiving hole, and the mechanical part is revolved in a state supported by the shaft. In the latter type of a mechanical part, the mechanical part is revolved while being supported, at its shaft, by bearing means. The present invention is concerned with the latter type of a mechanical part, and more particularly concerned with a mechanical part having shaft 1 integrally formed therewith produced by molding.

In the present invention, the term "shaft" means a portion at which a mechanical part is supported by another part (bearing means) so as to be stably revolved at the time of the operation of the mechanical part. In the accompanying drawings, representative examples of shafts are designated by reference numeral 1.

In the present invention, the term "functional segment" means a segment which is integrally formed with a shaft and exerts a function by revolution thereof on an axis of the shaft in accordance with a revolution of the shaft which is supported by bearing means. Examples of functional segments include a roller and a toothed wheel. In the accompanying drawings, rollers as an example of functional segments are indicated by reference numeral 2, and toothed wheels as another example of functional segments are indicated by reference numeral 7.

In the present invention, the term "hollow" used for a portion designated by reference numeral 8 means a hollow formed by a molding method for forming a hollow in a shaped resin article to be produced. The hollow is different from a void or a cell formed by a foaming agent. There is no particular limitation with respect to the molding method for forming a hollow in a shaped resin article to be produced. However, a hollow injection molding method is preferred since, in this method, a shaped, hollow resin article can be produced by a single shot of a resin without a need for joining together separate parts, and the occurrence of burrs and fins (flash) is small.

The term "hollow injection molding method" referred to in the present invention means an injection molding method in which a molten resin is injected into a cavity of a mold to be used in molding (the mold is usually a metal mold, but is not limited to a metal mold) to form a molten resin mass, and, subsequently, a hollow-forming fluid under pressure is introduced into the molten resin mass, and the molten resin mass is allowed to cool while being pressurized by the hollow-forming fluid, thereby obtaining a shaped, hollow resin article. In an ordinary injection molding method, after the sealing of the gate, the resin in the gate solidifies, so that the supply of the resin into the cavity is stopped and the resin pressure can no longer be applied. By contrast, in a hollow injection molding method, even after the sealing of the gate, the resin can be held in a pressurized state by means of a hollow-forming fluid introduced thereinto. Therefore, the hollow injection molding method is advantageous in that a pressurized state can be surely maintained, as compared to the ordinary injection molding method, and the shrinkage of a molten resin upon cooling can be complemented by the expansion of a hollow, so that a shaped resin article having a good reproduction of the cavity wall and a good dimensional precision can be easily produced. A representative method for hollow injection molding is disclosed in Examined Japanese Patent Application Publication No. 57-14968.

The hollow-forming fluid which can be used in the present invention is a fluid which is gaseous or liquid at room temperature and under atmospheric pressure, and which is not reactive to or compatible with a molten resin to be molded, under temperature and pressure conditions for an injection molding. Examples of such fluids include nitrogen, carbon dioxide, air, helium, neon, argon, water vapor, glycerin and liquid paraffin. Generally, a gaseous fluid is employed and an inert gas, such as nitrogen, helium, neon or argon, is especially preferable. From the viewpoint of economy, nitrogen gas is commercially more preferred.

The hollow injection molding method of the present invention is practiced by means of a combination of a conventional injection molding machine and an apparatus for supplying a hollow-forming fluid under pressure. The above-mentioned apparatus for supplying a hollow-forming fluid under pressure is one which introduces a hollow-forming fluid under pressure through a supply line into a molten resin mass injected into a mold cavity so that the molten resin mass in the mold cavity is pressurized by the hollow-forming fluid for a predetermined period of time. Examples of methods for the introduction of a hollow-forming fluid under pressure include a method in which a hollow-forming fluid which has been compressed to a predetermined high pressure and accumulated in an accumulator is introduced into a molten resin mass in a cavity through a supply line, and a method in which a predetermined amount of a hollow-forming fluid is directly introduced into a molten resin mass in the mold cavity by means of a pump or a pressure cylinder to thereby pressurize the molten resin mass. However, there is no particular limitation with respect to the method for the introduction of a hollow-forming fluid as long as the hollow-forming fluid under pressure can be introduced into the molten resin mass in the mold cavity. The pressure of the hollow-forming fluid is relieved before the mold is opened and a shaped, hollow resin article is released from the mold.

As mentioned above, the hollow, integral, functional segment-shaft structure constituting the hollow, resin mechanical part of the present invention has a hollow therein. The hollow ratio of the integral segment-shaft structure is preferably from 15 to 50%. When the hollow ratio is higher than the range as mentioned above, it is likely that the wall of a hollow molten resin balloon is broken under the pressure of the hollow-forming fluid, so that the molding becomes unstable. On the other hand, when the hollow ratio is smaller than the range as mentioned above, it is likely that a sink mark or a warpage occurs, so that it is difficult to achieve an improvement in the dimensional precision of the integral segment-shaft structure. The hollow ratio is defined by the following formula:

The hollow ratio (%) is defined by the formula $$[(V \times \rho - M)/(V \times \rho)] \times 100.$$

In the above formula, V represents an apparent volume of the shaped, hollow resin article (hollow, integral, functional segment-shaft structure), $\rho$ represents a specific gravity of the resin used, and M represents a weight of the shaped, hollow resin article (hollow, integral, functional segment-shaft structure).

Figure 6:
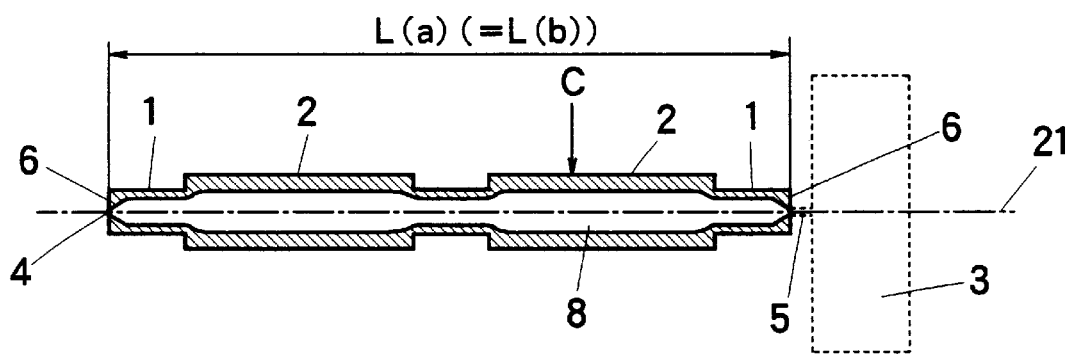
Figure 6:
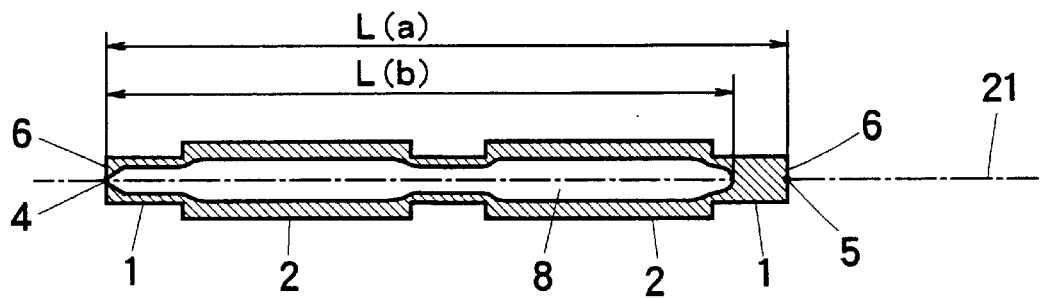

In the present invention, it is requisite that the hollow, integral, functional segment-shaft structure of the resin mechanical part of the present invention have hollow 8 continuously or discontinuously extending substantially along an axis of the integral segment-shaft structure, and that the entire length L(a) of the integral segment-shaft structure as measured along axis 21 and the length L(b) of the hollow as measured along axis 21 satisfy the relationships defined by the formula $0.9 \leq L(b)/L(a) \leq 1$. As shown in FIGS. 6(*a*) and 6(*b*), FIG. 15 and FIG. 16, the entire length L(a) of the integral segment-shaft structure as measured along axis 21 means an entire length of the integral segment-shaft structure as measured along the axis of the shaped, hollow article, and, as shown in the same Figs., the length L(b) of hollow 8 means the length of hollow 8 as measured along the axis of the integral segment-shaft structure, that is, the length L(b) is the length of a section of axis 21 which section is defined as the distance between the opposite inner end walls of hollow 8. Accordingly, when a plurality of hollow portions 8 are present in the integral segment-shaft structure, L(b) is defined as a total of the lengths of sections of axis 21 which sections correspond to all hollow portions 8. When L(a) and L(b) satisfy the relationships defined by the formula $0.9 \leq L(b)/L(a) \leq 1$, the integral segment-shaft structure exhibits a high dimensional precision. The reason for this is believed to reside in that the pressurizing effect of the hollow-forming fluid is exerted on the entire region of the molten resin mass during the molding, so that the dimensional precision of the resultant shaped resin article becomes high. By contrast, when L(a) and L(b) have a relationship defined by the formula 0.9>L(b)/L(a), the length of hollow 8 becomes too small, so that during the molding, the molten resin mass has a portion where the pressurizing effect of the hollow-forming fluid cannot be exerted and this portion becomes poor in dimensional precision. In the hollow injection molding method, which is preferably employed in the present invention, the molten resin is pressurized by means of a hollow-forming fluid so as to improve the transferability of the configuration of the cavity wall. However, when L(a) and L(b) have a relationship defined by the formula 0.9>L (b)/L(a), the length of hollow 8 becomes too small, so that the molten resin mass has a portion where the pressurizing effect of the hollow-forming fluid cannot be exerted and the transferability of the cavity wall becomes poor, and as a result, the final shaped resin article becomes poor in dimensional precision. It is preferred that L(a) and L(b) satisfy the relationships defined by the formula $0.95 \leq L(b)/L(a) \leq 1$. Most preferably, L(b)/L(a)=1.

With respect to the shaped, hollow resin article produced by the method disclosed in Japanese Patent Application Laid-Open Specification No. 5-208460, the shaped, hollow resin article has an L(b)/L(a) of only about 0.8. The present inventors have conducted experiments in accordance with the disclosure of Japanese Patent Application Laid-Open Specification No. 5-208460, and found that the length of a portion of the hollow resin article having no hollow 8 extending therein, is large, so that dimensional precision becomes extremely low (specifically, the dimensional precision of the teeth is low and the degree of run out is high).

The hollow injection molding method of the present invention can also be employed for molding a thermosetting resin. Examples of thermosetting resins which can be used in the present invention include a phenol resin, a urea resin, a melamine resin and an epoxy resin. In the present invention, the hollow, resin mechanical part having a shaft integrally formed therewith can be produced from a thermosetting resin. However, the resin mechanical part of the present invention is generally produced from a thermoplastic resin. With respect to thermoplastic resins which can be used in the present invention, there is no particular limitation as long as the resin can be molded under ordinary conditions. Examples of thermoplastic resins which can be used in the present invention include a polyethylene, a polypropylene, a polystyrene, an ABS resin, a polyvinyl chloride, a polyamide, an acetal polymer, a polycarbonate, a modified polyphenylene ether, a polyethylene terephthalate, a polybutylene terephthalate, a polyphenylene sulfide, polyimide, a polyamide imide, polyether imide, a polyarylate, a polysulfone, a polyether sulfone, a polyetheretherketone, a liquid crystalline resin, a polytetrafluoroethylene and a thermoplastic elastomer. Especially, a polyacetal and a polyamide are excellent not only in heat resistance and mechanical properties but also in sliding properties, so that they are widely used for the production of a mechanical part having a shaft integrally formed therewith, and they are also preferably used in the present invention.

Since the hollow, integral, functional segment-shaft structure constituting the mechanical part of the present invention has a hollow extending therein, if desired, an organic or inorganic filler may be blended with a resin to be used so as to improve heat resistance, mechanical strength or the like of the resultant mechanical part. Preferred examples of reinforcing fillers which can be used in the present invention include glass fibers, carbon fibers, metallic fibers, aramid fibers, potassium titanate, asbestos, silicon carbide, ceramics, silicon nitride, barium sulfate, calcium sulfate, kaolin, a clay, pyrophyllite, a bentonite, a sericite, a zeolite, a mica, nephelite, talc, attapulgite, wollastonite, slag fibers, a ferrite, calcium silicate, calcium carbonate, magnesium carbonate, dolomite, zinc oxide, titanium oxide, magnesium oxide, iron oxide, molybdenum disulfide, graphite, gypsum, glass beads, glass powders, glass balloons, quartz and quartz glass. The reinforcing fillers as mentioned above may have a hollow therein and can be used individually or in combination. Further, if desired, these fillers may be pretreated with a coupling agent, such as a silane-type or titanium-type coupling agent, before use.

According to one embodiment of the present invention (embodiment of item 2 of the above-enumerated embodiments of the present invention), the hollow, integral, functional segment-shaft structure of the mechanical part has, in an outer surface thereof, two openings communicating with the hollow, and the two openings are, respectively, located in two opposite end surfaces of the integral segment-shaft structure, wherein the two opposite end surfaces are separated by a distance equal to the length of the axis of the integral segment-shaft structure. Therefore, the integral segment-shaft structure satisfies the relationships defined by the formula L(b)/L(a)=1, so that a most preferred dimensional precision is obtained. Further, since the two openings are, respectively, located in two opposite end surfaces 6, 6 of the integral segment-shaft structure, it is unlikely that the two openings hinder the function of the mechanical part of the present invention.

Figure 7:
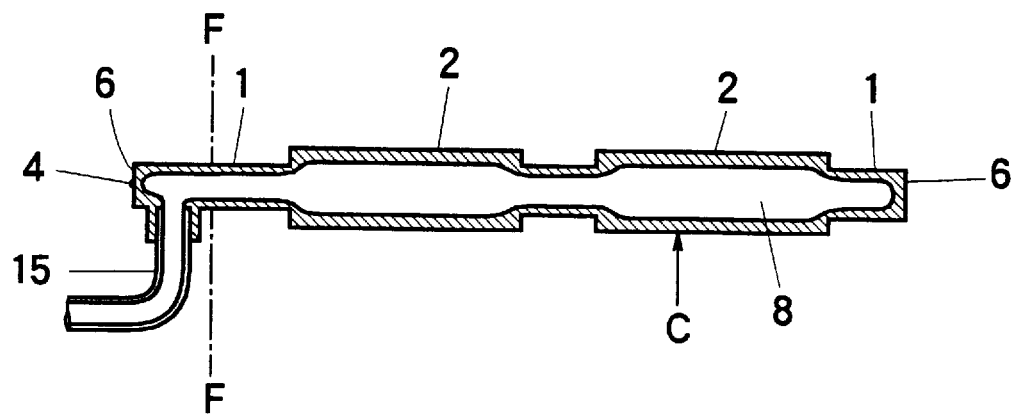
FIG. 7 is a diagrammatic cross-sectional view of a further form of a roller having a shaft integrally formed therewith according to the present invention, taken along a vertical plane containing the axis of the roller.
Figure 8:
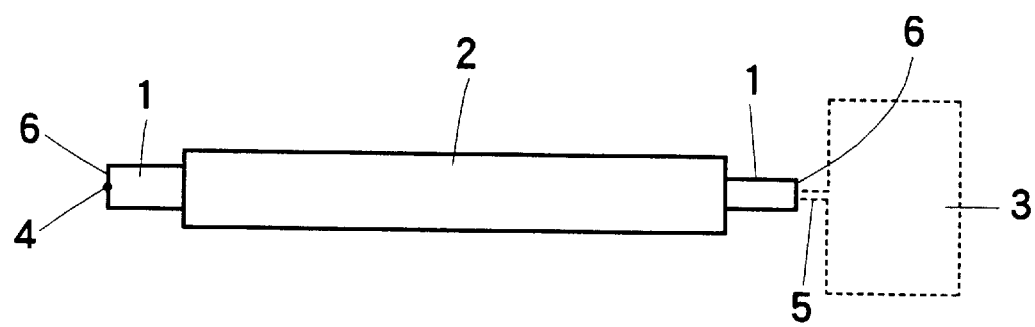
FIG. 8 is a diagrammatic side view of a further form of a roller having a shaft integrally formed therewith according to the present invention, shown together with an auxiliary chamber used in the production thereof indicated by a broken line.
Figure 9:
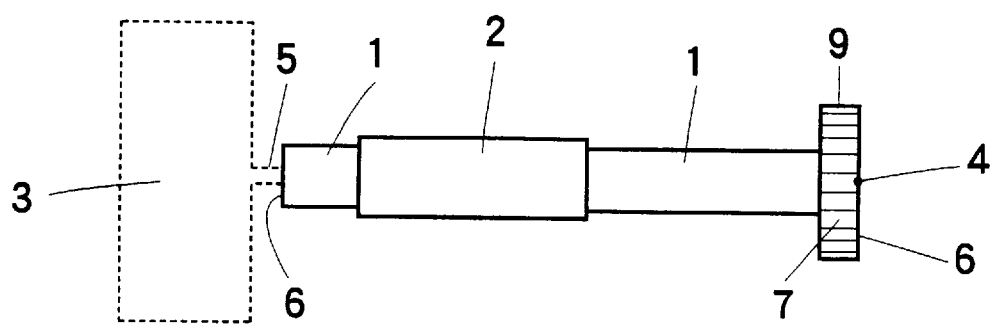
FIG. 9 is a diagrammatic side view of one form of a combination of a roller and a toothed wheel having a shaft integrally formed therewith according to the present invention, shown together with an auxiliary chamber used in the production thereof indicated by a broken line.

In the present invention, as shown in FIGS. 1 to 10(*a*) and 11 to 13, the term "end surface" is intended to mean an end surface spreading so as to traverse axis 21 of the integral segment-shaft structure. In many cases, the end surface is a flat surface. However, the end surface may not be a flat surface, and may be a curved surface, semi-spherical surface or the like. Further, when a functional segment, such as a toothed wheel, is located at an end portion of the integral segment-shaft structure as shown in FIG. 9, end surface 6 present on the functional segment also falls within the definition of end surface 6 as defined in the present invention.

Figure 17:
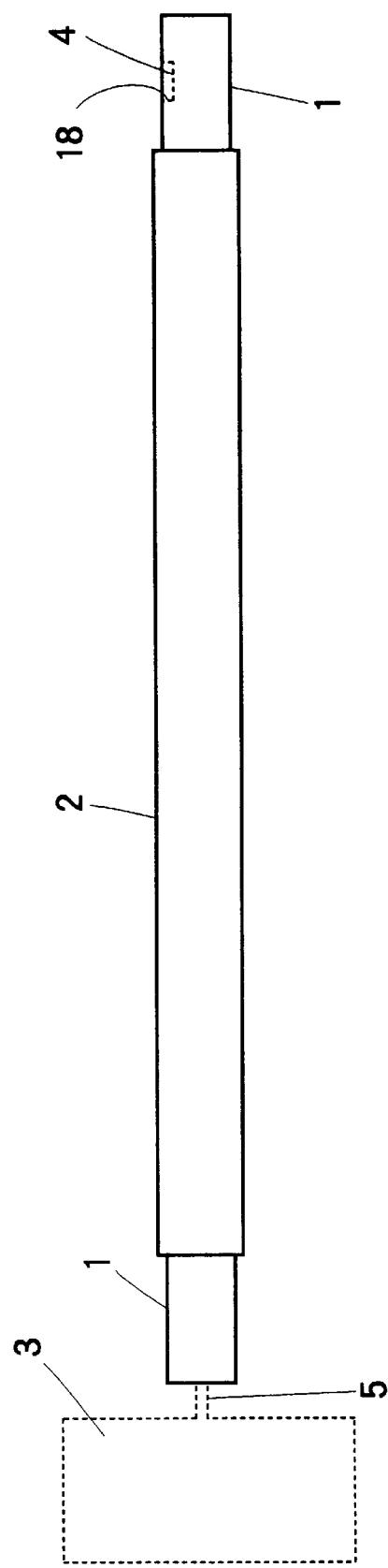
FIG. 17 is a diagrammatic side view of a further form of a roller having a shaft integrally formed therewith according to the present invention, shown together with an auxiliary chamber used in the production thereof indicated by a broken line.
Figure 18:
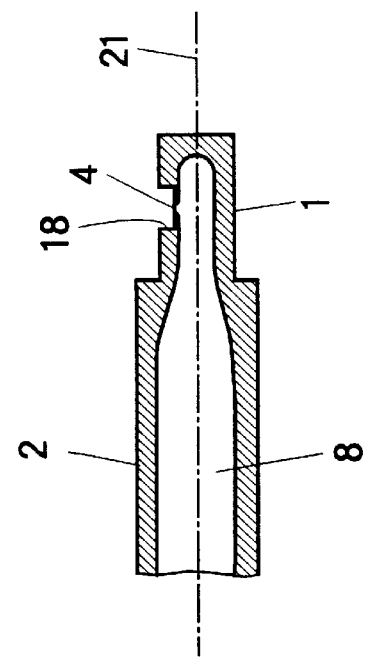
FIG. 18 is a diagrammatic cross-sectional view of a further form of a mechanical part having a shaft integrally formed therewith according to the present invention, showing portions around the opening.
Figure 19:
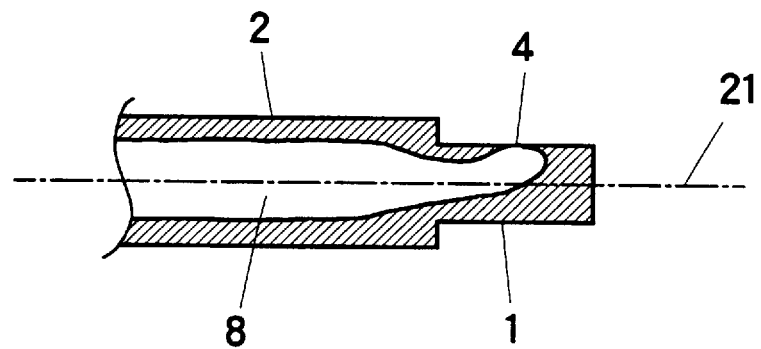
FIG. 19 is a diagrammatic cross-sectional view of a further form of a mechanical part having a shaft integrally formed therewith according to the present invention, showing portions around the opening.

According to another embodiment of the present invention (embodiment of item 3 of the above-enumerated embodiments of the present invention), as shown in, for example, FIGS. 15, 17 and 18, the hollow, integral, functional segment-shaft structure of the mechanical part has, in an outer surface thereof, two openings communicating with the hollow, and one of the two openings is located in one of two opposite end surfaces of the integral segment-shaft structure, the two opposite end surfaces being separated by a distance equal to the length of the axis of the integral segment-shaft structure, and the other opening is located in recess 18 formed in an outer surface portion other than the two opposite end surfaces, recess 18 being concaved in a direction from the outer surface portion toward the axis of the integral segment-shaft structure. This embodiment is preferable when both two openings cannot be formed in the two opposite end surfaces of the integral, segment-shaft structure due to the design or function of the mechanical part, or the construction of the mold. When the opening (to be located in an outer surface portion other than the two opposite end surfaces) is located in recess 18 concaved in a direction from the outer surface portion toward the axis of the integral segment-shaft structure, run out of the mechanical part is largely reduced, as compared to the case in which no such recess is used. The reason why such an advantageous effect can be achieved is considered to reside in that, as shown in FIG. 18, hollow 8 becomes symmetrical relative to axis 21.

According to a further embodiment of the present invention (embodiment of item 4 of the above-enumerated embodiments of the present invention), as shown in, for example, FIGS. 10(*a*), 10(*b*) and 10(*c*), at least a part of the functional segment constitutes toothed wheel 7. In general, toothed wheels having a shaft integrally formed therewith are widely used in various fields, such as automobiles, ordinary machinery, precision machinery and electric and electronic equipment. The mechanical part of the above embodiment is advantageous because it has not only high dimensional precision and excellent material-recycling characteristics, but also can be produced with high productivity.

According to still a further embodiment of the present invention (embodiment of item 5 of the above-enumerated embodiments of the present invention), as shown in, for example, FIGS. 10(*a*), 10(*b*) and 10(*c*), at least a part of the functional segment constitutes toothed wheel 7 coaxially formed with shaft 1, and toothed wheel 7 satisfies the relationships represented by the formula R1/r1=1 to 5, in which R1 represents the diameter of root circle 13 of toothed wheel 7 and r1 represents the diameter of shaft 1. The mechanical part of this embodiment is especially advantageous because of the high dimensional precision of the teeth of toothed wheel 7. However, when the R1/r1 ratio exceeds 5, the mechanical part becomes poor in dimensional precision. The reason for this is believed to reside in that a difference between the external morphology of the mechanical part and the morphology of the hollow present therein becomes large as different from the embodiments of FIGS. 10(*a*), 10(*b*), 10(*c*) and, therefore, the wall thickness of the mechanical part is largely varied between the shaft portion and the toothed wheel portion. In such a case, shrinkage of the resin becomes large at a portion in which a wall thickness thereof is large. Thus, the effect of the formation of the hollow becomes unsatisfactory. On the other hand, a mechanical part in which the R1/r1 ratio is less than 1 is of no practical use. In the present invention, the R1/r1 ratio is preferably 1 to 4. In this embodiment, when the mechanical part has two or more toothed wheels and/or has a shaft having two or more different diameters, it is requisite that the R1/r1 ratio be 1 to 5 with respect to any combinations of diameters of the root circles (R1) and two or more different diameters of the shaft (r1).

Figure 11:
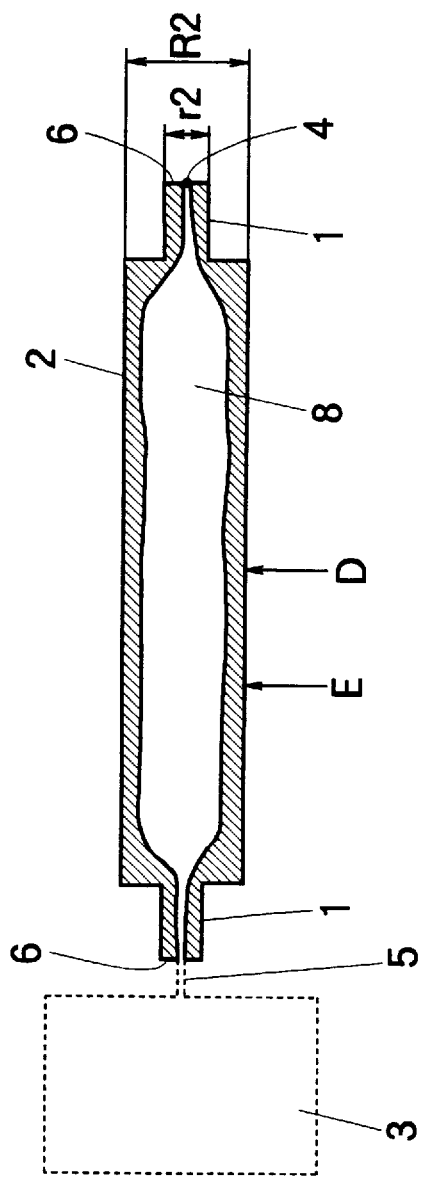
FIG. 11 is a diagrammatic cross-sectional view of a further form of a roller having a shaft integrally formed therewith according to the present invention, taken along a vertical plane containing the axis of the roller, shown together with an auxiliary chamber used in the production thereof indicated by a broken line.

According to still a further embodiment of the present invention (embodiment of item 6 of the above-enumerated embodiments of the present invention), as shown in, for example, FIG. 11, at least a part of the functional segment constitutes roller 2. In general, rollers having a shaft integrally formed therewith are widely used in various fields, such as automobiles, 5 ordinary machinery, precision machinery and electric and electronic equipment. The mechanical part of the above embodiment is advantageous because it has not only high dimensional precision and excellent material-recycling characteristics, but also can be produced with high productivity.

According to still a further embodiment of the present invention (embodiment of item 7 of the above-enumerated embodiments of the present invention), as shown in, for example, FIG. 11, at least a part of the functional segment constitutes roller 2 coaxially formed with shaft 1, and roller 2 satisfies the relationships represented by the formula R2/r2=1 to 4, in which R2 represents the diameter of roller 2 and r2 represents the diameter of shaft 1 (see FIG. 11). The mechanical part of this embodiment is especially advantageous because of the high dimensional precision of the roller. However, when the R2/r2 ratio exceeds 4, the mechanical part becomes poor in dimensional precision. The reason for this is considered to reside in that a difference between the external morphology of the mechanical part and the morphology of the hollow present therein becomes large as different from the embodiment of FIG. 11 and, therefore, the wall thickness of the mechanical part is largely varied between the shaft portion and the roller portion. In such a case, shrinkage of the resin becomes large at a portion in which a wall thickness thereof is large. Thus, the effect of the formation of the hollow becomes unsatisfactory. On the other hand, a mechanical part in which the R2/r2 ratio is less than 1 of no practical use. In the present invention, the R2/r2 ratio is preferably 1 to 3. In this embodiment, when the mechanical part has two or more rollers and/or has a shaft having two or more different diameters, it is requisite that the R2/r2 ratio be 1 to 4 with respect to any combinations of diameters of the rollers (R2) and two or more different diameters of the shaft (r2). For example, in the case of a mechanical part as shown in FIG. 8, which has shaft 1 having two different diameters and roller 2, in this embodiment, it is requisite that the R2/r2 ratio be 1 to 4 with respect to any combinations of diameters of roller 2 (R2) and two or more different diameters of shaft 1 (r2).

Figure 12:
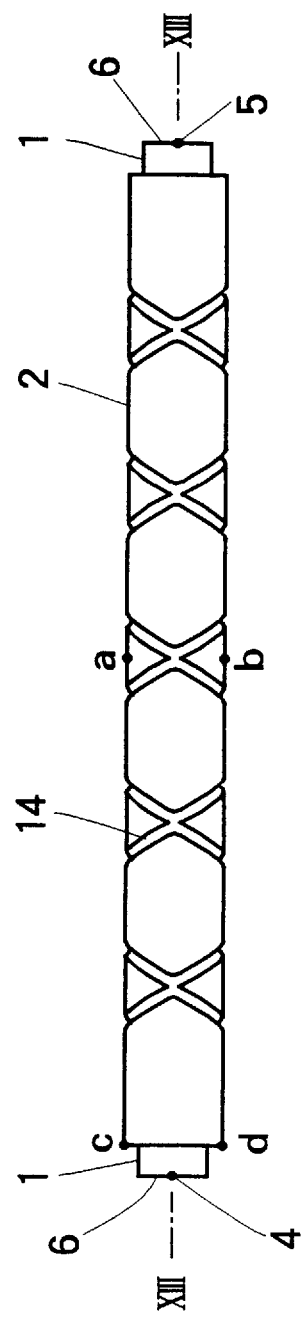
FIG. 12 is a diagrammatic side view of one form of a grooved roller having a shaft integrally formed therewith according to the present invention.

According to still a further embodiment of the present invention (embodiment of item 8 of the above-enumerated embodiments of the present invention), as shown in, for example, FIG. 12, at least a part of the functional segment constitutes roller 2 coaxially formed with shaft 1, and roller 2 has on a surface thereof groove 14 having a depth of not smaller than a width of groove 14, and roller 2 satisfies the relationships represented by the formula r3/R3≧0.5, in which r3 represents the distance between the inner bottom of groove 14 and the axis of the integral segment-shaft structure, and R3 represents the radius of the circular cross section of roller 2 at a portion thereof having no groove. The mechanical part of this embodiment is especially advantageous because of its high dimensional precision and high accuracy in movement. A representative example of uses of a grooved roller is an application in which a pin having two opposite end portions is provided separately from the roller, and one end portion of the pin is secured to an object other than the roller and the other end portion of the pin is inserted in the groove of the roller, so that the object having the pin inserted in the groove reciprocally moves along a line parallel to the axis of the roller in accordance with the rotation of the roller, to thereby transmit the movement of the roller to the pin. Such a grooved roller is widely used as a mechanical part in various types of printers and printer portions of various types of equipment.

In the embodiment of item 8 of the present invention, the depth of the groove found on a surface of the roller is not smaller than the width of the groove. This is because when the depth of the groove is smaller than the width of the groove, the end portion of a pin which is inserted in the groove is likely to come out of the groove during the rotation of the roller. The groove of the roller is formed by a corresponding convex portion formed on the cavity wall of the mold. The groove is generally formed spirally on a surface of the roller, but it is possible to select an appropriate one from the various types of morphology of grooves, depending on the rate and cycle of the reciprocating movement of a pin to be inserted in the groove. Further, in this embodiment, the roller satisfies the relationships represented by the formula r3/R3≧0.5, in which r3 represents the distance between the inner bottom of the groove and the axis of the integral segment-shaft structure, and R3 represents the radius of the circular cross section of the roller at a portion thereof having no groove. When r3 and R3 have relationships represented by the formula r3/R3<0.5, the mechanical part becomes poor in dimensional precision. The reason for this is considered to reside in that the pressurizing effect of a hollow-forming fluid cannot be fully exerted.

A preferred method for producing the mechanical part of the present invention is described in the embodiment of item 9 above. In this basic method, the mechanical part is produced by injecting a resin in a molten form into the cavity of a mold to be used in molding through the gate to form a molten resin mass in the cavity, and introducing a hollow-forming fluid under pressure into the molten resin mass through the gate to form a hollow within the molten resin mass. In this method, it is requisite that the gate be located in register with a position within a terminal region of the cavity which region has a length of 1/10 of the entire length of a hollow, integral, functional segment-shaft structure to be produced as measured along an axis thereof, so that the hollow, integral segment-shaft structure satisfies the relationships defined by the following formula (1):

$$0.9 \leq L(b)/L(a) \leq 1 \quad (1)$$

wherein L(a) represents the entire length of the integral segment-shaft structure as measured along the axis thereof, and L(b) represents the length of the hollow as measured along the axis of the integral segment-shaft structure.

In the above-mentioned preferred method of the present invention, as mentioned above, a hollow-forming fluid under pressure is introduced into the molten resin mass through the gate under pressure. Therefore, an inlet for introducing a hollow-forming fluid is formed at a position between a nozzle which is located at a forward end portion of the cylinder of the molding machine, and the gate. For example, an inlet for introducing a hollow-forming fluid is formed at the nozzle, or at a sprue or runner of the mold or the like. (For example, when it is desired that a hollow-forming fluid be introduced from a nozzle of the molding machine, a nozzle disclosed in Unexamined Japanese Patent Application Laid-Open Specification No. 4-90315 can be employed.) The method of the present invention in which a hollow-forming fluid is introduced into the molten resin mass through the gate but not through a portion of the cavity wall other than the gate, is high in productivity because after the molding, there is no need for cutting off a portion of the resin other than a portion of the resin corresponding to the gate. By contrast, in the method disclosed in Unexamined Japanese Patent Application Laid-Open Specification No. 5-208460, a hollow-forming fluid is introduced into the molten resin mass through an opening of the cavity wall other than the gate, so that after the molding, it is necessary to conduct an additional step for cutting off a portion of the resin corresponding to the opening of the cavity wall used for the introduction of the hollow-forming fluid, thereby lowering productivity. The method of the present invention is excellent in productivity in this respect, as compared to the method of Unexamined Japanese Patent Application Laid-Open Specification No. 5-208460.

According to another embodiment of the method of the present invention (embodiment of item 10 of the above-enumerated embodiments of the present invention), for preventing a hesitation mark and for increasing a hollow ratio, an auxiliary chamber communicated with the mold cavity is used (an auxiliary chamber is also called an "auxiliary cavity" or a "sacrificial cavity"). The auxiliary chamber is used for receiving a portion of a molten resin mass which is pushed out of the mold cavity under the pressure of the introduced hollow-forming fluid. An auxiliary chamber is disclosed in Unexamined Japanese Patent Application Laid-Open Specification No. 3-121820. When a molten resin is injected into a mold cavity to form a molten resin mass in a manner such that the cavity is filled with the molten resin mass, and a hollow-forming fluid is introduced under pressure into the mold cavity filled with the molten resin without using an auxiliary chamber, no hesitation mark occurs, but a hollow ratio becomes very low since the hollow-forming fluid can be introduced only in an amount corresponding to a shrinkage of the molten resin which occurs upon the cooling and solidification of the molten resin. This results in poor dimensional precision due to a warpage or a sink mark. In addition, because the resin thickness becomes large, the cycle time of molding is prolonged, so that productivity becomes low. In this embodiment of the method of the present invention, an auxiliary chamber is used and a molten resin is injected so as to fill the mold cavity for forming the hollow, integral, functional segment-shaft structure. Since the cavity is already filled with the molten resin mass at the time of completion of the injection of the resin, a flow front of the molten resin is present in the auxiliary chamber or at a path for communicating the cavity with the auxiliary chamber, thereby preventing the occurrence of a hesitation mark on the integral segment-shaft structure. In the present invention, a method for injecting a molten resin into a mold cavity for forming the integral segment-shaft structure, in an amount which fills or almost fills the mold cavity with a molten resin mass is called a "full-shot method". (On the other hand, a method for injecting a molten resin into a mold cavity for forming the integral segment-shaft structure, in an amount which leaves a space non-filled with a molten resin mass in the cavity is called a "short-shot method".) Further, Unexamined Japanese Patent Application Laid-Open Specification No. 3-121820 discloses a method in which an auxiliary chamber is used in addition to a mold cavity, and the auxiliary chamber is not communicated with the mold cavity at the time a molten resin is injected into the cavity, and the auxiliary chamber is communicated with the cavity at the time a hollow-forming fluid is introduced under pressure into a molten resin mass in the cavity. This method can suitably be used in the present invention.

Figure 2:
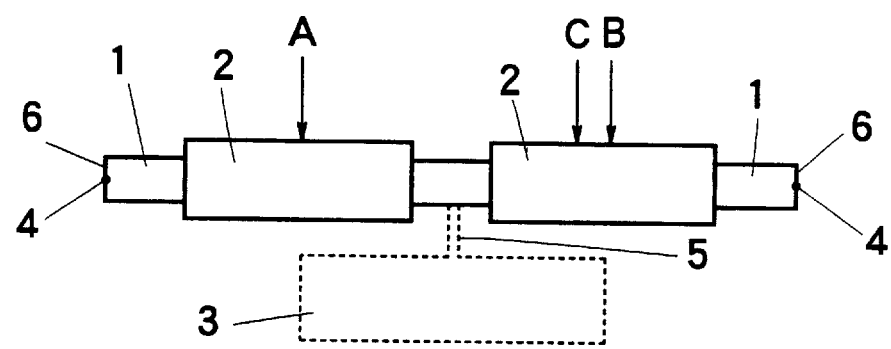
FIG. 2 is a diagrammatic side view of another form of a roller having a shaft integrally formed therewith produced by a method which is similar to but undesirably different from the method of the present invention.
Figure 3:
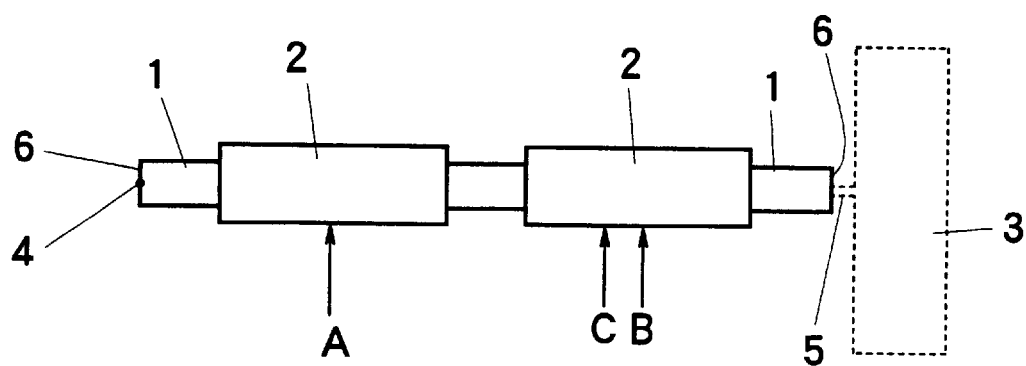
FIG. 3 is a diagrammatic side view of one form of a roller having a shaft integrally formed therewith according to the present invention, shown with an auxiliary chamber used in the production thereof indicated by a broken line.

Further, in the above-mentioned embodiment (corresponding to embodiment of item 10 above), the auxiliary chamber is communicated with the mold cavity through an opening formed in one of two opposite end walls of the cavity, the two opposite end walls being separated by a distance equal to the length of an axis of the cavity which axis corresponds to the axis of the integral segment-shaft structure to be produced. FIG. 3 illustrates a representative example of the location of path 5 communicating the cavity with auxiliary chamber 3, in connection with an integral segment-shaft structure having two rollers. In conducting a hollow injection molding method using an auxiliary chamber, it is conceivable to locate path 5 communicating the cavity with the auxiliary chamber as shown in FIG. 1 and FIG. 2. However, when communication path 5 is located in positions as shown in FIGS. 1 and 2, the integral segment-shaft structure has a low coaxiality and a high degree of run out, so that the location positions of path 5 as shown in FIGS. 1 and 2 are out of the scope of the present invention.

(In the case of the location of path 5 as shown in FIGS. 1 and 2, the integral segment-shaft structure has, in an outer surface thereof, three openings communicating with the hollow.) The reason why desirable results cannot be obtained in the methods shown in FIG. 1 and FIG. 2 is believed to reside in the morphology of the hollow. It is more preferred that path 5 communicating the mold cavity with the auxiliary chamber be located so that the axis of the hollow of the integral segment-shaft structure passes through the opening which is formed on an end wall of the cavity and communicates the mold cavity with the auxiliary chamber. By this more preferred method, the integral segment-shaft structure has a high dimensional precision. The reason for this is believed to reside in that by this more preferred method, the hollow becomes nearly symmetrical relative to the axis.

In the above-mentioned embodiment (corresponding to embodiment of item 10 above) of the method of the present invention, it is preferred that the gate be located at a position close to the end wall of the cavity remote from the auxiliary chamber. More specifically, it is preferred that the gate be located in register with a position within a terminal region of the cavity which region has a length of 1/10 of the entire length of a hollow, integral, functional segment-shaft structure to be produced as measured along an axis thereof, the terminal region being remote from the auxiliary chamber.

In the above-mentioned embodiment (corresponding to embodiment of item 9 above) of the method of the present invention, it is requisite that the gate be located in register with a position within a terminal region of the cavity which region has a length of 1/10 of the entire length of a hollow, integral, functional segment-shaft structure to be produced as measured along an axis thereof. As a result, the obtained integral segment-shaft structure satisfies the relationships defined by the following formula (1):

$$0.9 \leq L(b)/L(a) \leq 1.0 \tag{1}$$

The embodiment (corresponding to embodiment of item 9 above) can be practiced more easily by appropriately regulating the volume of a molten resin injected into the cavity. For instance, when a volume of a molten resin injected into the cavity is increased, a volume of a hollow-forming fluid subsequently introduced into a molten resin mass in the cavity is decreased, so that the length L(b) becomes small. On the other hand, when a volume of a molten resin injected into the cavity is decreased, a volume of a hollow-forming fluid introduced into a molten resin mass in the cavity is increased, so that the length L(b) becomes large. Therefore, if the L(b)/L(a) ratio is less than 0.9, the relationships defined by the formula $0.9 \leq L(b)/L(a) \leq 1.0$ can be satisfied by decreasing a volume of a molten resin injected into the cavity to thereby increase the length L(b). However, when a volume of a molten resin to be injected is decreased too much, the wall of a hollow molten resin balloon is broken under the pressure of the hollow-forming fluid, so that the pressure of the hollow-forming fluid is relieved before the molten resin solidifies, and, therefore, a satisfactory molding cannot be conducted. Consequently, according to the embodiment (corresponding to embodiment of item 9 above), it is likely that the L(b)/L(a) ratio does not become 1.0, but becomes less than 1.0.

In the embodiment (corresponding to embodiment of item 10 above) as well as the embodiment (corresponding to embodiment of item 9 above), it is requisite that the gate be located in register with a position within a terminal region of the cavity which region has a length of 1/10 of the entire length of a hollow, integral, functional segment-shaft structure to be produced as measured along an axis thereof. As a result, the integral segment-shaft structure satisfies the relationships defined by the following formula (1):

$$0.9 \leq L(b)/L(a) \leq 1.0 \tag{1}$$

The embodiment (corresponding to embodiment of item 10 above) can be practiced more easily by regulating a volume of a molten resin to be injected into the cavity and, if desired, an internal volume of an auxiliary chamber. For instance, when an increased volume of a molten resin is injected into the cavity, a volume of a hollow-forming fluid subsequently introduced into a molten resin mass in the cavity is decreased, so that the length L(b) becomes small. On the other hand, when a decreased volume of a molten resin is injected into the cavity, a volume of a hollow-forming fluid introduced into a molten resin mass in the cavity is increased, so that the length L(b) becomes large. Further, when an internal volume of an auxiliary chamber is decreased, a decreased volume of a hollow-forming fluid is introduced into a molten resin mass in the cavity, so that the length L(b) becomes small. On the other hand, when an internal volume of an auxiliary chamber is increased, an increased volume of a hollow-forming fluid is introduced into a molten resin mass in the cavity, so that the length L(b) becomes large. Therefore, if the L(b)/L(a) ratio is less than 0.9, the relationships defined by the formula $0.9 \leq L(b)/L(a) \leq 1.0$ can be satisfied by injecting a decreased volume of a molten resin into the cavity or by increasing an internal volume of an auxiliary chamber to thereby increase the length L(b). In a most preferred embodiment, the auxiliary chamber is communicated with the mold cavity through an opening which is formed in one of two opposite end walls of the cavity, the two opposite end walls being separated by a distance equal to the length of an axis of the cavity which axis corresponds to the axis of the integral segment-shaft structure to be produced, the one end wall being positioned on a side remote from a gate, and, in addition, the volume of a molten resin and the internal volume of an auxiliary chamber are regulated so that the hollow-forming fluid enters the auxiliary chamber and the L(b)/L(a) ratio becomes 1.0.

According to still another embodiment of the method of the present invention (embodiment of item 11 of the above-enumerated embodiments of the present invention), as shown in, for example, FIGS. 3 and 6(a), the auxiliary chamber is communicated with the mold cavity through an opening which is formed in one of two opposite end walls of the cavity, the two opposite end walls being separated by a distance equal to the length of an axis of the cavity which axis corresponds to the axis of the integral segment-shaft structure to be produced, the one end wall being positioned on a side remote from the gate. By this embodiment of the method of the present invention, the integral segment-shaft structure of the embodiment of item 2 of the above-enumerated embodiments of the present invention is obtained which has improved coaxiality and a low degree of run out. With respect to the reason why the integral segment-shaft structure obtained in this embodiment is especially excellent, various presumptions can be made. However, the reason is believed to reside in that flow patterns of a molten resin and a hollow-forming fluid in the cavity become symmetrical relative to the axis of the integral segment-shaft structure to be produced, resulting in a uniform wall thickness of the integral segment-shaft structure. The term "wall thickness" used herein means a distance between the inner surface and outer surface of the integral segment-shaft structure.

Figure 20:
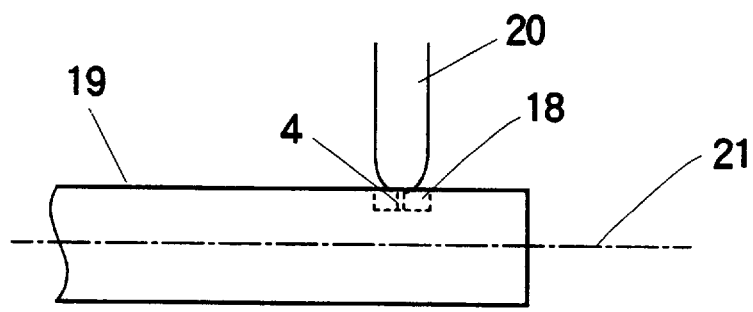
Figure 20:
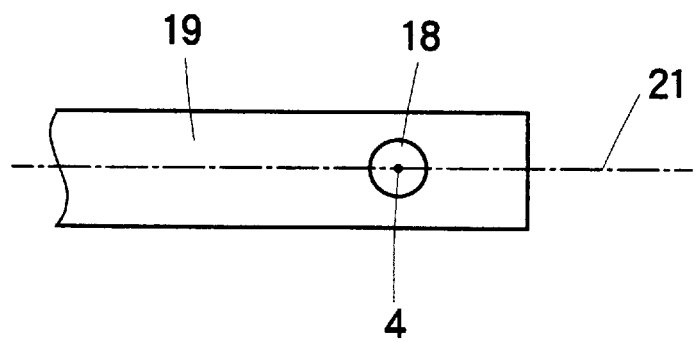
Figure 21:
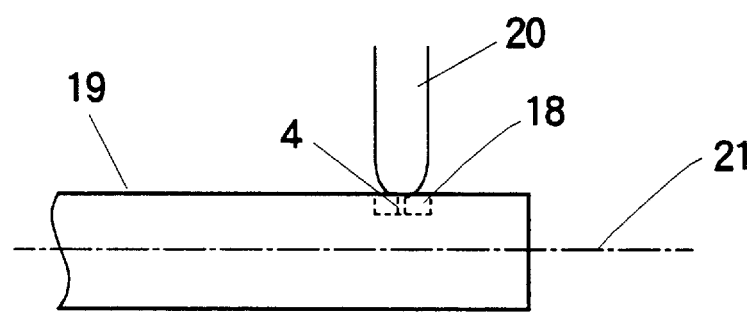
Figure 21:
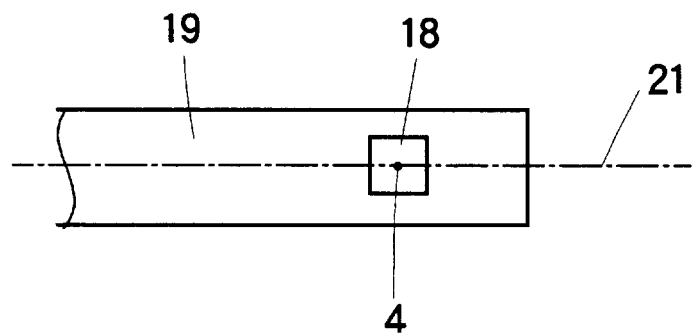
Figure 22:
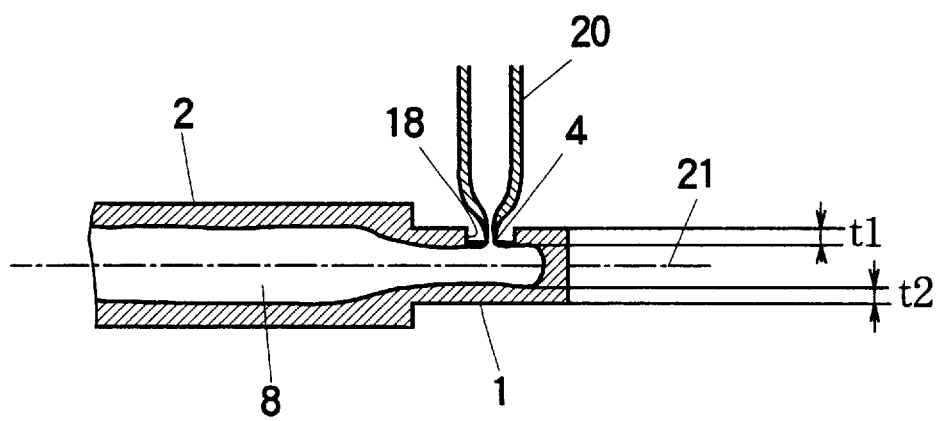
FIG. 22 is a diagrammatic, cross-sectional explanatory view illustrating how still another mode of the hollow injection molding method according to the present invention is practiced, showing portions around the gate.
Figure 23:
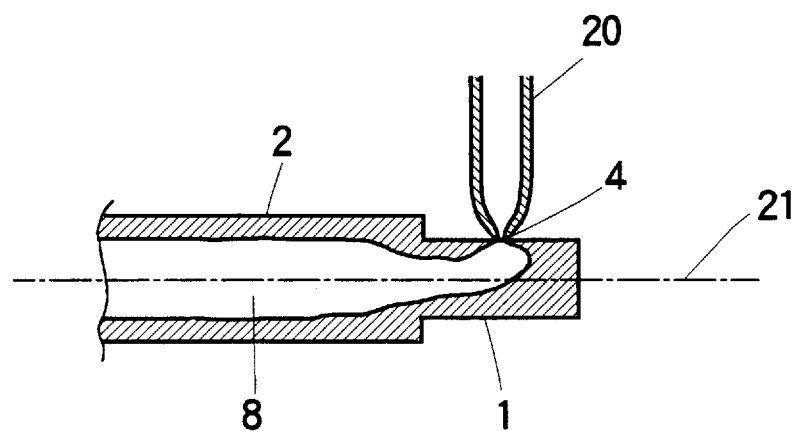
FIG. 23 is a diagrammatic, cross-sectional explanatory view illustrating how a further mode of the hollow injection molding method according to the present invention is practiced, showing portions around the gate.

According to a further embodiment of the method of the present invention (embodiment of item 12 of the above-enumerated embodiments of the present invention), as shown in, for example, FIGS. 20(*a*) and 20(*b*), a protrusion is formed in a wall of the mold defining the cavity, the protrusion corresponding to a recess which is to be formed in the integral segment-shaft structure at its outer surface portion other than two opposite end surfaces separated by a distance equal to the length of the axis of the integral segment-shaft structure to be produced and which is to be concaved in a direction from the outer surface portion toward the axis of the integral segment-shaft structure, and wherein the gate is located in the protrusion in the wall defining the cavity and directed so that the molten resin is injected into the cavity in a direction perpendicular to an axis of the cavity which axis corresponds to the axis of the integral segment-shaft structure to be produced. This embodiment is preferable when both two openings cannot be formed-in the two opposite end surfaces of the integral, segment-shaft structure due to the design or function of the mechanical part, or the construction of the mold. As shown in FIG. 22, when opening 4 (to be located in an outer surface portion other than the two opposite end surfaces) corresponding to the gate is located in recess 18 concaved in a direction from the outer surface portion toward the axis of the integral segment-shaft structure, run out of the mechanical part is largely reduced, as compared to the case in which no such a recess is used. The reason why such an advantageous effect can be achieved is believed to reside in that, as shown in FIG. 22, hollow 8 becomes symmetrical relative to axis 21. Further, since in this embodiment, the molten resin is injected into the cavity in a direction perpendicular to an axis of the cavity which axis corresponds to axis 21 of the integral segment-shaft structure to be produced, the molten resin injected at a high speed into the cavity collides with a cavity wall surface opposite to the gate at right angles before flowing and spreading in the cavity, so that a deterioration of the surface finish condition of a shaped, hollow resin article due to the so-called "jetting phenomenon" (a phenomenon in which a scattering pattern of a molten resin remains on the surface of a shaped article) can be prevented. The morphology of recess 18 in the method of this embodiment of the present invention may be, for example, cylindrical (see FIG. 20(*a*) and FIG. 20(*b*)) or prismatic (see FIG. 21(*a*) and FIG. 21(*b*)). There is no particular limitation with respect to the morphology of recess 18 and any morphology can be employed as long as opening 4 corresponding to a gate can be located in recess 18 which is concaved in a direction from an outer surface portion toward the axis of the integral segment-shaft structure to be produced. However, the larger the area of recess 18 as viewed from just above (i.e., the area of the circle when the recess is cylindrical), the smaller the effect of lowering the degree of run out. Therefore, it is preferred that the area of recess 18 as view from just above be as small as possible. However, when the area of recess 18 as view from just above is too small and, therefore, the wall thickness of a portion of the mold which corresponds to recess 18 is too small, it is possible that the mold will be broken under the pressures of an injected molten resin and an introduced hollow-forming fluid. Therefore, it is preferred that the area of recess 18 as view from just above be as small as possible but not smaller than a level at which a portion of the mold which corresponds to recess 18 surely has a wall thickness enough to withstand the above-mentioned pressures. Further, when the depth of recess 18 is too small or too large, the effect of lowering the degree of run out becomes small. Referring to FIG. 22, recess 18 preferably has a t1/t2 ratio of ½ to ⅗, more preferably ¾ to 5/4, most preferably about 1, wherein t1 represents the depth of recess 18 and t2 represents the wall thickness of the integral segment-shaft structure at a portion opposite to recess 18. The term "wall thickness" used herein means a distance between the inner surface and outer surface of the integral segment-shaft structure.

According to still a further embodiment of the method of the present invention (embodiment of item 13 of the above-enumerated embodiments of the present invention), as shown in, for example, FIGS. 10(*a*), 10(*b*) and 10(*c*), the cavity has an internal morphology adapted for producing a hollow, integral, functional segment-shaft structure in which at least a part of the functional segment constitutes toothed wheel 7. In general, toothed wheels having a shaft integrally formed therewith are widely used in various fields, such as automobiles, ordinary machinery, precision machinery and electric and electronic equipment. The mechanical part obtained by the method of the above embodiment is advantageous because it has not only high dimensional precision and excellent material-recycling characteristics, but also can be produced with high productivity.

According to still a further embodiment of the method of the present invention (embodiment of item 14 of the above-enumerated embodiments of the present invention), as shown in, for example, FIGS. 10(*a*), 10(*b*) and 10(*c*), the cavity has an internal morphology adapted for producing a hollow, integral, functional segment-shaft structure in which at least a part of the functional segment constitutes toothed wheel 7 coaxially formed with shaft 1, and toothed wheel 7 satisfies the relationships represented by the formula R1/r1=1 to 5, in which R1 represents the diameter of root circle 13 of toothed wheel 7 and r1 represents the diameter of shaft 1. The mechanical part obtained by the method of this embodiment is especially advantageous because of the high dimensional precision of the teeth of toothed wheel 7. However, when the R1/r1 ratio exceeds 5, the mechanical part becomes poor in dimensional precision. The reason for this is considered to reside in that the difference between the external morphology of the mechanical part and the morphology of the hollow present therein becomes large as different from the embodiments of FIGS. 10(*a*), 10(*b*) and 10(*c*) and, therefore, the wall thickness of the mechanical part is largely varied between the shaft and the toothed wheel. In such a case, shrinkage of the resin becomes large at a portion in which a wall thickness thereof is large. Thus, the effect of the formation of the hollow becomes unsatisfactory. On the other hand, a mechanical part in which the R1/r1 ratio is less than 1 is of no practical use. In the present invention, the R1/r1 ratio is preferably 1 to 4. In this embodiment, when the mechanical part has two or more toothed wheels and/or has a shaft having two or more different diameters, it is requisite that the R1/r1 ratio be 1 to 5 with respect to any combinations of diameters of the root circles (R1) and two or more different diameters of the shaft (r1).

According to still a further embodiment of the method of the present invention (embodiment of item 15 of the above-enumerated embodiments of the present invention), as shown in, for example, FIG. 11, the cavity has an internal morphology adapted for producing a hollow, integral, functional segment-shaft structure in which at least a part of the functional segment constitutes roller 2. In general, rollers having a shaft integrally formed therewith are widely used in various fields, such as automobiles, ordinary machinery, precision machinery and electric and electronic equipment. The mechanical part obtained by the method of the above embodiment is advantageous because it has not only high dimensional precision and excellent material-recycling characteristics, but also can be produced with high productivity.

According to still a further embodiment of the method of the present invention (embodiment of item 16 of the above-enumerated embodiments of the present invention), as shown in, for example, FIG. 11, the cavity has an internal morphology adapted for producing a hollow, integral, functional segment-shaft structure in which at least a part of the functional segment constitutes roller 2 coaxially formed with shaft 1, and roller 2 satisfies the relationships represented by the formula R2/r2=1 to 4, in which R2 represents the diameter of roller 2 and r2 represents the diameter of shaft 1. The mechanical part obtained by the method of this embodiment is especially advantageous because of the high dimensional precision of the roller. However, when the R2/r2 ratio exceeds 4, the mechanical part becomes poor in dimensional precision. The reason for this is believed to reside in that a difference between the external morphology of the mechanical part and the morphology of the hollow present therein becomes large as different from the embodiment of FIG. 11, and, therefore, the wall thickness of the mechanical part is largely varied between the shaft and the roller. In such a case, shrinkage of the resin becomes large at a portion in which a wall thickness thereof is large. Thus, the effect of the formation of the hollow becomes unsatisfactory. On the other hand, a mechanical part in which the R2/r2 ratio is less than 1 of no practical use. In the present invention, the R2/r2 ratio is preferably 1 to 3. In this embodiment, when the mechanical part has two or more rollers and/or has a shaft having two or more different diameters, it is requisite that the R2/r2 ratio be 1 to 4 with respect to any combinations of diameters of the rollers (R2) and two or more different diameters of the shaft (r2). For example, in the case of a mechanical part as shown in FIG. 8, which has shaft 1 having two different diameters and roller 2, in this embodiment, it is requisite that the R2/r2 ratio be 1 to 4 with respect to any combinations of a diameter of roller 2 (R2) and two different diameters of shaft 1 (r2).

According to still a further embodiment of the method of the present invention (embodiment of item 17 of the above-enumerated embodiments of the present invention), as shown in, for example, FIG. 12, the cavity has an internal morphology adapted for producing a hollow, integral, functional segment-shaft structure in which at least a part of the functional segment constitutes roller 2 coaxially formed with shaft 1, and roller 2 has on a surface thereof groove 14 having a depth of not smaller than a width of groove 14, and roller 2 satisfies the relationships represented by the formula r3/R3≧0.5, in which r3 represents the distance between the inner bottom of groove 14 and the axis of the integral segment-shaft structure, and R3 represents the radius of the circular cross section of roller 2 at a portion thereof having no groove. The mechanical part obtained by the method of this embodiment is especially advantageous because of its high dimensional precision and high accuracy in movement. A representative example of uses of a grooved roller in an application in which a pin having two opposite end portions is provided separately from the roller, and one end portion of the pin is secured to an object other than the roller and the other end portion of the pin is inserted in the groove of the roller, so that the object having the pin inserted in the groove reciprocally moves along a line parallel to the axis of the roller in accordance with the rotation of the roller, to thereby transmit the movement of the roller to the pin. Such a grooved roller is widely used in various types of printers and printer portions of various types of equipment.

In the embodiment of item 17 of the present invention, the depth of the groove formed on a surface of the roller is not smaller than the width of the groove. This is because when the depth of the groove is smaller than the width of the groove, the end portion of a pin which is inserted in the groove is likely to come out of the groove during the rotation of the roller. The groove of the roller is formed by a corresponding convex portion formed on the cavity wall of the mold. The groove is generally formed spirally on a surface of the roller, but it is possible to select an appropriate one from the various types of morphology of grooves, depending on the rate and cycle of the reciprocating movement of a pin to be inserted in the groove. Further, in this embodiment, the roller satisfies the relationships represented by the formula r3/R3≧0.5, in which r3 represents the distance between the inner bottom of the groove and the axis of the integral segment-shaft structure, and R3 represents the radius of the circular cross section of the roller at a portion thereof having no groove. When r3 and R3 have relationships represented by the formula r3/R3<0.5, the mechanical part becomes poor in dimensional precision. The reason for this is considered to reside in that the pressurizing effect of a hollow-forming fluid cannot be fully exerted.

BEST MODE FOR CARRYING OUT THE INVENTION

The present invention will be described in more detail with reference to Examples, which should not be construed as limiting the scope of the present invention.

Example 1

A roller having a shaft integrally formed therewith as shown in FIG. 3 was produced. As shown in FIG. 3, the integral roller-shaft structure has two rollers 2, 2 and has an entire length of 90 mm (wherein each of terminal shaft portions 1, 1 located at both ends of the structure has a length of 10 mm and each roller 2 has a length of 30 mm), and each terminal shaft portion 1 has a diameter of 6 mm and each roller 2 has a diameter of 10 mm. In FIG. 3, an auxiliary chamber used in the production is also shown (the auxiliary chamber has a rectangular parallelopiped morphology and has an internal volume which is about 40% of the apparent volume of the integral roller-shaft structure to be produced).

Specifically, the hollow injection molding of an acetal copolymer was conducted at a mold temperature of 80° C. and at a cylinder temperature of 200° C. As a hollow-forming fluid to be introduced into a molten resin mass in the cavity of the mold, nitrogen gas was employed. A gas inlet was provided in a nozzle located at the forward end of a cylinder of the molding machine. As shown in FIG. 3, gate 4, and path 5 for communicating the cavity with auxiliary chamber 3 were formed in two opposite end walls of the cavity, wherein the two opposite end walls of the cavity correspond to two opposite end surfaces 6, 6 of the integral roller-shaft structure.

The resin was melted in the cylinder of the molding machine and injected into the mold cavity through the nozzle of the cylinder and the gate so as to fill the cavity with a molten resin mass. Subsequently, nitrogen gas, which was supplied through the nozzle of the cylinder, was introduced into the molten resin mass to form a hollow within the molten resin mass. The nitrogen gas employed was one which had previously been pressurized to a pressure of 100 kg/cm² in an apparatus for supplying a hollow-forming fluid. The nitrogen gas was introduced into the molten resin mass through the nozzle, sprue, runner and gate, and the nitrogen gas penetrated the molten resin present in the nozzle, sprue, runner and gate.

By the introduction of the nitrogen gas as the hollow-forming fluid into the molten resin mass to form hollow 8, a portion of the molten resin mass was caused to be pushed out of the cavity into auxiliary chamber 3. The hollow-forming fluid reached the inside of auxiliary chamber 3, so that the resultant integral roller-shaft structure satisfied a relationship represented by the formula L(a)=L(b). The integral roller-shaft structure had a hollow ratio of about 35%.

In the above hollow injection molding, the introduction of the nitrogen gas under pressure was effected under conditions such that the gas introduction delay time (a time between the completion of the injection of a molten resin and the introduction of the gas into the molten resin mass) was 0 second, that the gas introduction time (a time for the introduction of the gas) was 5 seconds, and that the pressure holding time (a total of the gas introduction time and the time for which the gas is held under pressure in the cavity in a closed system, subsequent to stopping the gas introduction) was 35 seconds. 5 seconds after the end of the pressure holding time, the mold was opened and the shaped resin article obtained was released from the mold. The obtained shaped resin article had a cross-section as shown in FIG. 6(*a*).

Figure 14:
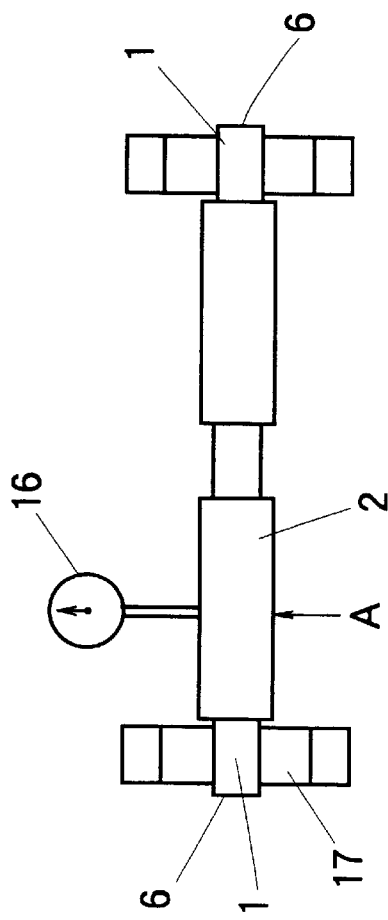
FIG. 14 is a diagrammatic explanatory view illustrating how a roller having a shaft integrally formed therewith is measured with respect to the degree of run out.

The obtained roller having a shaft integrally formed therewith was evaluated with respect to the degree of run out, in the following manner. As shown in FIG. 14, the integral roller-shaft structure was supported, at both terminal shaft portions 1, 1 thereof, by V blocks 17, 17. Dial gauge 16 was brought into contact with each of portions A, B and C of rollers 2, 2 shown in FIG. 3 in a manner such that any displacement in a direction perpendicular to axis 21 of the integral roller-shaft structure can be detected. Portions A and B are each positioned in the middle of the length of roller 2 and portion C is at a distance of 4 mm from portion B. Rollers 2, 2 were revolved once on axis 21 of the integral roller-shaft structure, and the maximum and minimum values of displacement measured by dial gauge 16 during the revolution were obtained, and a difference between the maximum and minimum values was taken as the degree of run out. In a roller, the smaller the degree of run out, the higher the dimensional precision, so that an improved accuracy of operation can be ensured. FIG. 14 is a diagrammatic explanatory view illustrating how a roller having a shaft integrally formed therewith is measured with respect to the degree of run out (in FIG. 14, the measuring site is portion A).

Further, the integral roller-shaft structure thus produced was also examined to find whether or not a hesitation mark was observed.

Results are shown in Tables 1(*a*) and 1(*b*).

The results show that the integral roller-shaft structure obtained in this Example is low in the degree of run out. The results also show that the integral roller-shaft structure has no hesitation mark, indicating that even a local run out does not occur and the appearance is good. Thus, it has been found that the obtained integral roller-shaft structure was excellent as a mechanical part.

Example 2

A roller having a shaft integrally formed therewith was obtained and evaluated in substantially the same manner as in Example 1, except that the shot volume of the molten resin was increased so that nitrogen gas was prevented from entering the auxiliary chamber, wherein the L(b)/L(a) ratio became 0.97. The obtained integral roller-shaft structure had a hollow ratio of about 34%.

Results are shown in Table 1(*a*).

The results show that the integral roller-shaft structure obtained in this Example is low in the degree of run out. The results also show that the integral roller-shaft structure has no hesitation mark, indicating that even a local run out does not occur, which means that the integral roller-shaft structure has high dimensional precision, and the appearance is good. Thus, it has been found that the obtained integral roller-shaft structure is excellent as a mechanical part.

Example 3

A roller having a shaft integrally formed therewith was obtained and evaluated in substantially the same manner as in Example 1, except that the shot volume of the molten resin was increased so that nitrogen gas was prevented from entering the auxiliary chamber, wherein the L(b)/L(a) ratio became 0.92. The obtained shaped resin article had a cross-section as shown in FIG. 6(*b*). The obtained integral roller-shaft structure had a hollow ratio of about 32%.

Results are shown in Table 1(*a*).

The results show that the integral roller-shaft structure obtained in this Example is low in the degree of run out. The results also show that the integral roller-shaft structure has no hesitation mark, indicating that even a local run out does not occur, which means that the integral roller-shaft structure has high dimensional precision, and the appearance is good. Thus, it has been found that the obtained integral roller-shaft structure is excellent as a mechanical part.

Comparative Example 1

A roller having a shaft integrally formed therewith was obtained and evaluated in substantially the same manner as in Example 1, except that the shot volume of the molten resin was increased so that nitrogen gas was prevented from entering the auxiliary chamber, wherein the L(b)/L(a) ratio became 0.87.

Results are shown in Table 1(*a*).

The results show that the integral roller-shaft structure obtained in this Example has no hesitation mark, but is high in the degree of run out. Thus, it has been found that the obtained integral roller-shaft structure is unsatisfactory as a mechanical part.

Example 4

A roller having a shaft integrally formed therewith was obtained and evaluated in substantially the same manner as in Example 1, except that the gas inlet was provided in the runner. Nitrogen gas was introduced into the molten resin mass through the runner and gate, and the nitrogen gas penetrated the molten resin present in the runner and gate. The hollow-forming fluid reached the inside of the auxiliary chamber, so that the L(b)/L(a) ratio became 1.00. The obtained integral roller-shaft structure had a hollow ratio of about 35%. The obtained shaped resin article had the same hollow as obtained in Example 1.

Results are shown in Table 1(*b*).

The results show that the integral roller-shaft structure obtained in this Example is low in the degree of run out. The results also show that the integral roller-shaft structure has no hesitation mark, indicating that even a local run out does not occur, which means that the integral roller-shaft structure has high dimensional precision, and the appearance is good. Thus, it has been found that the obtained integral roller-shaft structure is excellent as a mechanical part.

Comparative Example 2

A roller having a shaft integrally formed therewith was obtained and evaluated in substantially the same manner as in Example 1, except that, as shown in FIG. 1, gate 4 was formed in a mold wall at a portion in register with the center of the cavity, wherein the center of the cavity corresponds to the center of the axis of the integral roller-shaft structure to be produced, and that paths 5, 5 for communicating the cavity with auxiliary chambers 3, 3 were, respectively, formed in the two opposite end walls of the cavity, wherein the two opposite end walls of the cavity correspond to two opposite end surfaces 6, 6 of the integral roller-shaft structure. Auxiliary chambers 3, 3 shown in FIG. 1 had the same size and the same morphology. Each of auxiliary chambers 3, 3 had a rectangular parallelopiped morphology, and the total internal volume of them was about 40% of the apparent volume of the integral roller-shaft structure to be produced. The L(b)/L(a) ratio became 1.00.

Figure 4:
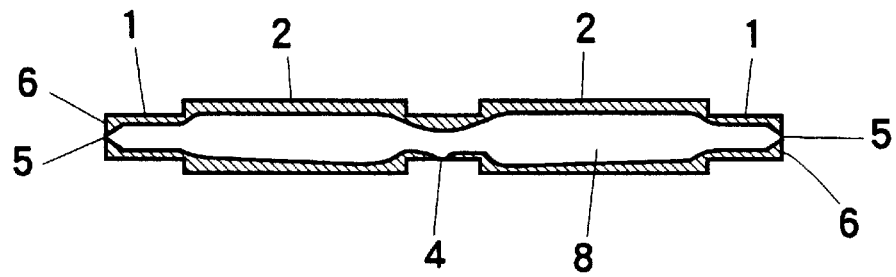
FIG. 4 is a diagrammatic cross-sectional view of the roller having a shaft integrally formed therewith of FIG. 1, taken along a vertical plane containing the axis of the roller.

The obtained integral roller-shaft structure had a cross-section as shown in FIG. 4. As shown in FIG. 4, the roller had three openings, that is, one opening for gate 4 and two openings for paths 5, 5 for communicating hollow 8 with auxiliary chambers 3, 3, respectively.

Results are shown in Table 1(b).

The results show that the integral roller-shaft structure obtained in this comparative example has no hesitation mark, but is high in degree of run out at portions A and B. Thus, it has been found that the integral roller-shaft structure is unsatisfactory as a mechanical part.

Comparative Example 3

A roller having a shaft integrally formed therewith was obtained and evaluated in substantially the same manner as in Example 1, except that, as shown in FIG. 2, gates 4, 4 were, respectively, formed in the two opposite end walls of the cavity, wherein the two opposite end walls of the cavity correspond to two opposite end surfaces 6, 6 of the integral roller-shaft structure, and that path 5 for communicating the cavity with auxiliary chamber 3 was formed in a mold wall at a portion in register with the center of the cavity, wherein the center of the cavity corresponds to the center of the axis of the integral roller-shaft structure to be produced. Auxiliary chamber 3 shown in FIG. 2 had a rectangular parallelopiped morphology, and the internal volume thereof was about 40% of the apparent volume of the integral roller-shaft structure to be produced. The L(b)/L(a) ratio became 0.84.

Figure 5:
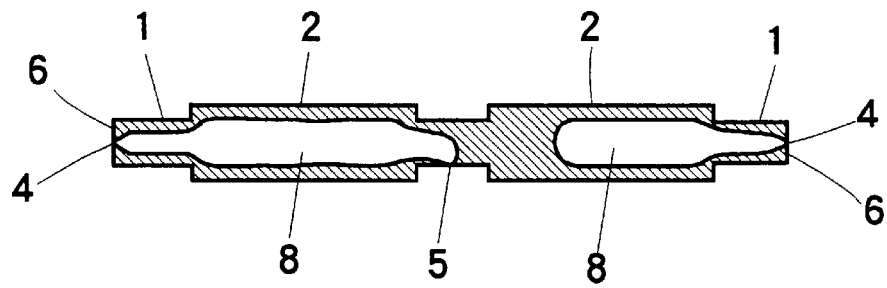
FIG. 5 is a diagrammatic cross-sectional view of the roller having a shaft integrally formed therewith of FIG. 2, taken along a vertical plane containing the axis of the roller.

The obtained integral roller-shaft structure had a cross-section as shown in FIG. 5. As shown in FIG. 5, the roller had three openings, that is, two openings for gates 4, 4 and one opening for path 5 for communicating hollow 8 with auxiliary chamber 3.

Results are shown in Table 1(b).

The results show that the integral roller-shaft structure obtained in this comparative example has no hesitation mark, but is high in degree of run out at portions A and B. Thus, it has been found that the integral roller-shaft structure is unsatisfactory as a mechanical part.

Example 5

A roller having a shaft integrally formed therewith was obtained and evaluated in substantially the same manner as in Example 1, except that auxiliary chamber 3 was not used, and the shot volume of the molten resin was reduced to about 65% of that employed in Example 1. The L(b)/L(a) ratio was 0.92.

The obtained integral roller-shaft structure had a hesitation mark around a portion corresponding to portion C indicated in FIG. 3.

Further, the integral roller-shaft structure was evaluated at portions A and B thereof with respect to the degree of run out in the same manner as described in Example 1. Likewise, the degree of run out at portion C around which the hesitation mark was observed, was evaluated.

Results are shown in Table 1(b).

The results show that the integral roller-shaft structure is low in degree of run out at portions A and B, although a local, slight run out occurs due to the hesitation mark.

Example 6

A roller having a shaft integrally formed therewith was obtained and evaluated in substantially the same manner as in Example 1, except that auxiliary chamber 3 was not used, that inlet 15 for a hollow-forming fluid was formed as shown in FIG. 7, and that the shot volume of the molten resin was reduced to about 65% of that employed in Example 1. The L(b)/L(a) ratio was 0.97.

The thus obtained molded product was cut along line F—F as shown in FIG. 7, thereby obtaining an integral roller-shaft structure.

The obtained integral roller-shaft structure had a hesitation mark around a portion corresponding to portion C indicated in FIG. 7.

Further, the integral roller-shaft structure was evaluated at portions A and B thereof with respect to the degree of run out in the same manner as described in Example 1. Likewise, the degree of run out at portion C around which the hesitation mark was observed, was evaluated.

Results are shown in Table 1(b).

The results show that the integral roller-shaft structure is low in degree of run out at portions A and B, although a local, slight run out is exhibited due to the hesitation mark.

Comparative Example 4

Substantially the same procedure as in Example 1 was repeated, except that the same shot volume of the molten resin as employed in Example 5 was used. Nitrogen gas as a hollow-forming fluid was introduced into the molten resin mass through the nozzle, sprue, runner and gate, and penetrated the molten resin present in the nozzle, sprue, runner and gate, and reached the inside of the auxiliary chamber. However, since the shot volume of the molten resin was small, the molten resin introduced from the cavity to the auxiliary chamber could not fill the auxiliary chamber, so that, in the auxiliary chamber, a hollow, molten resin balloon having nitrogen gas continued to be supplied thereinto was formed, leaving a space therearound in the auxiliary chamber. The wall of the resin balloon was broken under the pressure of the nitrogen gas, so that the introduced gas was released from the hollow of the molten resin mass in the cavity before cooling of the resin. Therefore, molding of the resin could not be performed.

Comparative Example 5

Substantially the same procedure as in Example 5 was repeated, except that the shot volume of the molten resin was increased so that the cavity was filled with the resin. As a result, a hollow ratio was decreased to a level as low as 10% or less and a substantial resin thickness became large, so that the cycle time of molding was prolonged about 4 times as long as that in Example 14, leading to a low productivity. In this Comparative Example, the L(b)/L(a) ratio was 0.15.

Example 7

A roller having a shaft integrally formed therewith was obtained and evaluated in substantially the same manner as in Example 1, except that a polyamide (Nylon 66) was used as a resin and cylinder temperature was set to 290° C. The L(b)/L(a) ratio was 1.00. The obtained integral roller-shaft structure had a hollow ratio of 35%.

In this Example, substantially the same hollow, resin shaped article as in Example 1 was obtained. Results are shown in Table 2.

The results show that the integral roller-shaft structure obtained in this example is low in degree of run out. The results also show that the integral roller-shaft structure has no hesitation mark, indicating that even a local run out does not occur and the appearance is good. Thus, it has been found that the obtained integral roller-shaft structure is excellent as a mechanical part.

Example 8

A roller having a shaft integrally formed therewith was obtained and evaluated in substantially the same manner as in Example 4, except that a polyamide (Nylon 66) was used as a resin and cylinder temperature was set to 290° C. The L(b)/L(a) ratio was 1.00. The obtained integral roller-shaft structure had a hollow ratio of 35%.

In this Example, substantially the same hollow, resin shaped article as in Example 4 was obtained. Results are shown in Table 2.

The results show that the integral roller-shaft structure obtained in this example is low in degree of run out. The results also show that the integral roller-shaft structure has no hesitation mark, indiating that even a local run out does not occur and the appearance is good. Thus, it has been found that the obtained integral roller-shaft structure is excellent as a mechanical part.

Comparative Example 6

A roller having a shaft integrally formed therewith was obtained and evaluated in substantially the same manner as in Comparative Example 2, except that a polyamide (Nylon 66) was used as a resin and cylinder temperature was set to 290° C. The L(b)/L(a) ratio was 1.00.

In this comparative example, substantially the same hollow, resin shaped article as in Comparative Example 2 was obtained. Results are shown in Table 2.

The integral roller-shaft structure obtained in this comparative example has no hesitation mark, but is high in degree of run out at portions A and B. Thus, it has been found that the integral roller-shaft structure is unsatisfactory as a mechanical part.

Comparative Example 7

A roller having a shaft integrally formed therewith was obtained and evaluated in substantially the same manner as in Comparative Example 3, except that a polyamide (Nylon 66) was used as a resin and cylinder temperature was set to 290° C. The L(b)/L(a) ratio was 0.84.

In this comparative example, substantially the same hollow, resin shaped article as in Comparative Example 3 was obtained. Results are shown in Table 2.

The integral roller-shaft structure obtained in this comparative example has no hesitation mark, but is high in degree of run out at portions A and B. Thus, it has been found that the integral roller-shaft structure is unsatisfactory as a mechanical part.

Example 9

A roller having a shaft integrally formed therewith was obtained and evaluated in substantially the same manner as in Example 5, except that a polyamide (Nylon 66) was used as a resin and cylinder temperature was set to 290° C. The L(b)/L(a) ratio was 0.92.

In this example, substantially the same hollow, resin shaped article as in Example 5 was obtained. Results are shown in Table 2.

The integral roller-shaft structure obtained in this example is low in degree of run out at portions A and B, although a local, slight run out due to a hesitation mark occurs.

Comparative Example 8

A roller having a shaft integrally formed therewith was obtained and evaluated in substantially the same manner as in Comparative Example 4, except that a polyamide (Nylon 66) was used as a resin and cylinder temperature was set to 290° C.

A nitrogen gas was introduced into the molten resin mass through the nozzle, sprue, runner and gate, and the nitrogen gas penetrated the molten resin present in the nozzle, sprue, runner and gate, and reached the inside of the auxiliary chamber.

In the auxiliary chamber, since the volume of the molten resin was small, the molten resin introduced from the cavity to the auxiliary chamber could not fill the auxiliary chamber, so that a hollow, molten resin balloon having nitrogen gas continued to be supplied thereinto was formed, leaving a space therearound in the auxiliary chamber. The wall of the resin balloon was broken under the pressure of the nitrogen gas, so that the introduced gas was released from the hollow of the molten resin mass in the cavity before cooling of the resin. Therefore, molding of the resin could not be performed.

Examples 10 and 11

In each of Examples 10 and 11, a roller having a shaft integrally formed therewith as shown in FIG. 17 was produced. As shown in FIG. 17, the integral roller-shaft structure has an entire length of 200 mm (wherein each of terminal shaft portions 1, 1 located at both ends of the structure has a length of 2 cm), and each terminal shaft portion 1 has a diameter of 10 mm and each roller 2 has a diameter of 12 mm. In FIG. 17, an auxiliary chamber used in the production is also shown (the auxiliary chamber has a rectangular parallelopiped morphology and has an internal volume which is about 40% of the apparent volume of the integral roller-shaft structure to be produced).

Specifically, in Example 10, the hollow injection molding of an acetal copolymer was conducted at a mold temperature of 80° C. and at a cylinder temperature of 200° C., and in Example 11, the hollow injection molding of a polyamide (nylon 66) was conducted at a mold temperature of 80° C. and at a cylinder temperature of 290° C. As a hollow-forming fluid to be introduced into a molten resin mass in the cavity of the mold, nitrogen gas was employed. A gas inlet was provided in a nozzle located at the forward end of a cylinder of the molding machine. As shown in FIG. 15, recess 18 was formed at one of terminal shaft portions 1, 1 and an opening corresponding to gate 4 was provided in recess 18. Recess 18 had a cylindrical morphology which is the same as that of the recess shown in FIGS. 20(a) and 20(b). The above cylindrical recess 18 had a radius of 2.5 mm and a depth of 2 mm.

The resin was melted in the cylinder of the molding machine and injected into the mold cavity through the nozzle of the cylinder and the gate so as to fill the cavity with a molten resin mass (the shot volume of the resin was approximately the same as the internal volume of the cavity). Subsequently, nitrogen gas, which was supplied through the nozzle of the cylinder, was introduced into the molten resin mass to form a hollow within the molten resin mass. The nitrogen gas employed was one which had previously been pressurized to a pressure of 100 kg/cm$^2$ in an apparatus for supplying a hollow-forming fluid. The nitrogen gas was introduced into the molten resin mass through the nozzle, sprue, runner and gate, and the nitrogen gas penetrated the molten resin present in the nozzle, sprue, runner and gate. By the introduction of the nitrogen gas as the hollow-forming fluid into the molten resin mass to form hollow 8, a portion of the molten resin mass was caused to be pushed out of the cavity into auxiliary chamber 3. The hollow-forming fluid reached the inside of auxiliary chamber 3, so that the resultant integral roller-shaft structure had a relationship represented by the formula L(b)/L(a)=0.98, and a hollow ratio of 35%.

In the above hollow injection molding, the introduction of the nitrogen gas under pressure was effected under conditions such that the gas introduction delay time (a time between the completion of the injection of a molten resin and the introduction of the gas into the molten resin mass) was 0.1 second, that the gas introduction time (a time for the introduction of the gas) was 5 seconds, and that the pressure holding time (a total of the gas introduction time and the time for which the gas is held under pressure in the cavity in a closed system, subsequent to stopping the gas introduction) was 50 seconds. 5 seconds after the end of the pressure holding time, the mold was opened and the shaped resin article obtained was released from the mold. The obtained shaped resin article had a cross-section as shown in FIG. 15.

The obtained integral roller-shaft structures were evaluated with respect to the degree of run out, in the following manner. The integral roller-shaft structure was supported, at both terminal shaft portions 1, 1 thereof, by V blocks. Roller 2 was revolved once on axis 21 of the integral roller-shaft structure and the degree of run out (a difference between the maximum and minimum values of displacement measured during the revolution) was measured in a direction perpendicular to axis 21 of the integral roller-shaft structure at portion A in FIG. 15 (portion A was in register with the center of roller 2) in the same manner as in Example 1. In a roller, the smaller the degree of run out, the higher the dimensional precision, so that an improved accuracy of operation can be ensured.

Further, the integral roller-shaft structures thus produced were also examined to find whether or not a hesitation mark was observed.

Results are shown in Table 3.

The results show that the integral roller-shaft structures obtained in Examples 10 and 11 are low in the degree of run out. The results also show that the integral roller-shaft structures have no hesitation mark. Thus, it has been found that the obtained integral roller-shaft structures are excellent as mechanical parts.

Examples 12 to 21

Figure 10A:
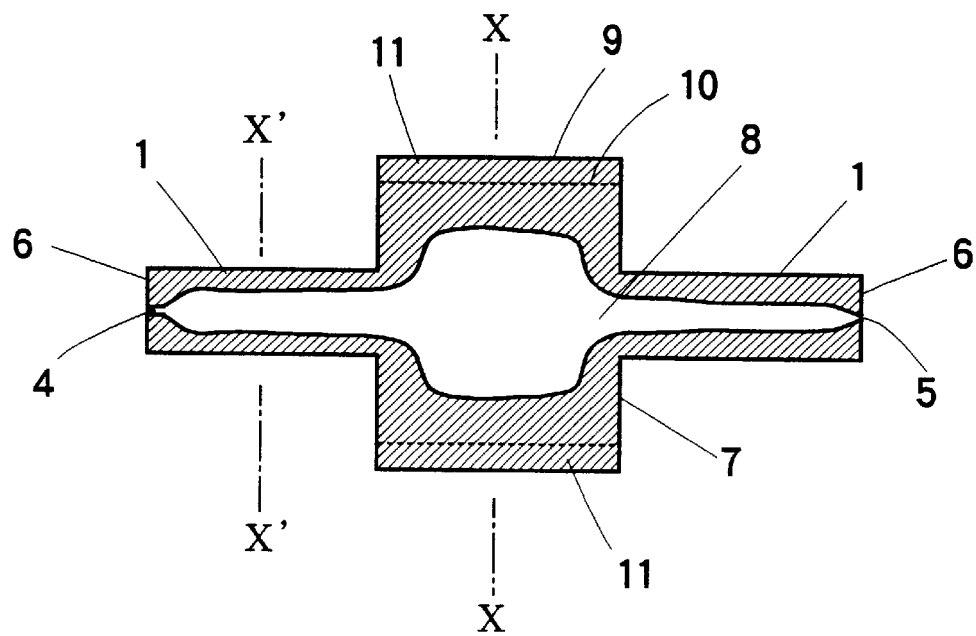
FIG. 10(a) is a diagrammatic cross-sectional view of one form of a toothed wheel having a shaft integrally formed therewith according to the present invention, taken along a vertical plane containing the axis of the toothed wheel.
Figure 10B:
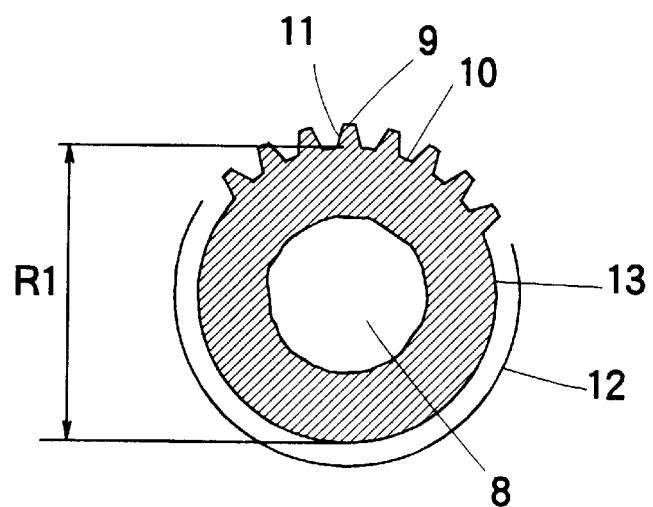
FIG. 10(b) is a diagrammatic cross-sectional view of the toothed wheel of FIG. 10(a), taken along the line X—X, in which a part of teeth is not shown.
Figure 10C:
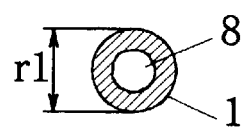
FIG. 10(c) is a diagrammatic cross-sectional view of the toothed wheel of FIG. 10(a), taken along the line X'—X'.

In each of Examples 12 to 21, a spur gear having a shaft integrally formed therewith, which had a morphology as defined by the following items, was produced. The obtained integral toothed wheel-shaft structure had cross-sections as shown in FIGS. 10(a), 10(b) and 10(c).

Module* : 1.0

Number of teeth : 11–42

Diameter of the root circle of the toothed wheel: 8.5–39.5 mm

Diameter of the tip circle of the toothed wheel: 13–44 mm

Face width of a tooth: 20 mm

Standard pressure angle: 20°

Diameter of a shaft : 8 mm

Length of each of terminal shaft portions : 20 mm at both sides of the toothed wheel (* Module is a value obtained by dividing the diameter of pitch circle (mm) by the number of teeth)

In Examples 12 to 16, the hollow injection molding of an acetal copolymer was conducted at a mold temperature of 80° C. and at a cylinder temperature of 200° C., and in Examples 17 to 21, the hollow injection molding of a polyamide (nylon 66) was conducted at a mold temperature of 80° C. and at a cylinder temperature of 290° C. As a hollow-forming fluid to be introduced into a molten resin mass in the cavity of the mold, nitrogen gas was employed. A gas inlet was provided in a nozzle located at the forward end of a cylinder of the molding machine. As shown in FIG. 10(a), gate 4, and path 5 for communicating the cavity with an auxiliary chamber were formed in two opposite end walls of the cavity, wherein the two opposite end walls of the cavity correspond to two opposite end surfaces 6, 6 of the integral toothed wheel-shaft structure.

The resin was melted in the cylinder of the molding machine and injected into the mold cavity through the nozzle of the cylinder and the gate so as to fill the cavity with a molten resin mass. Subsequently, nitrogen gas, which was supplied through the nozzle of the cylinder, was introduced into the molten resin mass to form a hollow within the molten resin mass. The nitrogen gas employed was one which had previously been pressurized to a pressure of 150 kg/cm$^2$ in an apparatus for supplying a hollow-forming fluid. The nitrogen gas was introduced into the molten resin mass through the nozzle, sprue, runner and gate, and the nitrogen gas penetrated the molten resin present in the nozzle, sprue, runner and gate.

By the introduction of the nitrogen gas as the hollow-forming fluid into the molten resin mass to form hollow 8, a portion of the molten resin mass was caused to be pushed out of the cavity into auxiliary chamber 3. The hollow-forming fluid reached the inside of auxiliary chamber 3, so that the resultant integral toothed wheel-shaft structure had a relationship represented by the formula L(b)/L(a)=1.00 and a hollow ratio of about 25%. Formed hollow 8 had a cross-section as shown in FIGS. 10(a), 10(b) and 10(c).

In the above hollow injection molding, the introduction of the nitrogen gas under pressure was effected under conditions such that the gas introduction delay time (a time between the completion of the injection of a molten resin and the introduction of the gas into the molten resin mass)

was 0.5 second, that the gas introduction time (a time for the introduction of the gas) was 5 seconds, and that the pressure holding time (a total of the gas introduction time and the time for which the gas is held under pressure in the cavity in a closed system, subsequent to stopping the gas introduction) was 38 seconds. 5 seconds after the end of the pressure holding time, the mold was opened and the shaped resin article obtained was released from the mold.

The precision of the obtained integral toothed wheel-shaft structure was evaluated using the criteria "tooth profile error" and "lead error" according to the JIS standard for a toothed wheel (JIS B 1702). Both of the above errors are measured as dimensional differences of the obtained toothed wheel from the ideal involute toothed wheel. Accordingly, the smaller the error value, the higher the dimensional precision, so that an improved accuracy of operation can be ensured. The above evaluations were conducted using an apparatus for the evaluation of a toothed wheel (GC–1HP, manufactured and sold by OSAKA SEIMITSU KIKAI Co., Ltd., Japan).

Results are shown in Tables 4 and 5. With respect to the integral toothed wheel-shaft structure obtained in each of Examples 12 to 21, no hesitation mark was observed.

The results also show that both of the tooth profile error and the lead error of each of the integral toothed wheel-shaft structures obtained in Examples 12 to 21 are small, indicating that the integral toothed wheel-shaft structure has excellent dimensional precision as a mechanical part. Particularly, the integral toothed wheel-shaft structures having an R1/r1 ratio of 1 to 4 is especially useful because the above errors are extremely small.

Comparative Examples 9 and 10

In Comparative Examples 9 and 10, substantially the same procedure as in Examples 14 and 19 was repeated, except that the shot volume of the molten resin was reduced to about 75% of the shot volume in Examples 14 and 19.

Nitrogen gas as a hollow-forming fluid was introduced into the molten resin mass through the nozzle, sprue, runner and gate, and penetrated the molten resin present in the nozzle, sprue, runner and gate, and reached the inside of the auxiliary chamber. However, since the shot volume of the molten resin was small, the molten resin introduced from the cavity to the auxiliary chamber could not fill the auxiliary chamber, so that a hollow, molten resin balloon having nitrogen gas continued to be supplied thereinto was formed, leaving a space therearound in the auxiliary chamber. The wall of the resin balloon was broken under the pressure of the nitrogen gas, so that the introduced gas was released from the hollow of the molten resin mass in the cavity before cooling of the resin. Therefore, molding of the resin could not be performed.

Comparative Example 11

Substantially the same procedure as in Example 14 was repeated, except that the auxiliary chamber was not used. As a result, a hollow ratio was decreased to a level as low as 10% or less and a substantial resin thickness became large, so that the cycle time of molding was prolonged about 4 times as long as that in Example 14, leading to a low productivity. In this Comparative Example, the L(b)/L(a) ratio was 0.20.

Examples 22 to 31

In each of Examples 22 to 31, a roller having a shaft integrally formed therewith was produced. The integral roller-shaft structure has an entire length of 200 mm (wherein each of the terminal shaft portions 1, 1 located at both ends of the structure has a length of 2 cm), and each terminal shaft portion 1 has a diameter of 10 mm and roller 2 has a diameter of 10 to 40 mm. The obtained integral roller-shaft structure had a cross-section as shown in FIG. 11. In FIG. 11, auxiliary chamber 3 used in the production is also shown by a broken line.

Specifically, in Examples 22 to 26, the hollow injection molding of an acetal copolymer was conducted at a mold temperature of 80° C. and at a cylinder temperature of 200° C., and in Examples 27 to 31, the hollow injection molding of a polyamide (Nylon 66) was conducted at a mold temperature of 80° C. and at a cylinder temperature of 290° C. As a hollow-forming fluid to be introduced into a molten resin mass in the cavity of the mold, nitrogen gas was employed. A gas inlet was provided in a nozzle located at the forward end of a cylinder of the molding machine. As shown in FIG. 11, gate 4, and path 5 for communicating the cavity with auxiliary chamber 3 were formed in two opposite end walls of the cavity, wherein the two opposite end walls of the cavity correspond to the two opposite end surfaces 6, 6 of the integral roller-shaft structure.

The resin was melted in the cylinder of the molding machine and injected into the mold cavity through the nozzle of the cylinder and the gate so as to fill the cavity with a molten resin mass. Subsequently, nitrogen gas, which was supplied through the nozzle of the cylinder, was introduced into the molten resin mass to form a hollow within the molten resin mass. The nitrogen gas employed was one which had previously been pressurized to a pressure of 100 kg/cm$^2$ in an apparatus for supplying a hollow-forming fluid. The nitrogen gas was introduced into the molten resin mass through the nozzle, sprue, runner and gate, and the nitrogen gas penetrated the molten resin present in the nozzle, sprue, runner and gate.

By the introduction of the nitrogen gas as the hollow-forming fluid into the molten resin mass to form hollow 8, a portion of the molten resin mass was caused to be pushed out of the cavity into auxiliary chamber 3, and the hollow-forming fluid reached the inside of auxiliary chamber 3. Hollow 8 had a cross-section as shown in FIG. 11. The L(b)/L(a) ratio was 1.00.

In the above hollow injection molding, the introduction of the nitrogen gas under pressure was effected under conditions such that the gas introduction delay time (a time between the completion of the injection of a molten resin and the introduction of the gas into the molten resin mass) was 0 second, that the gas introduction time (a time for the introduction of the gas) was 5 seconds, and that the pressure holding time (a total of the gas introduction time and the time for which the gas is held under pressure in the cavity in a closed system, subsequent to stopping the gas introduction) was 40 seconds. 5 seconds after the end of the pressure holding time, the mold was opened and the shaped resin article obtained was released from the mold.

The obtained roller having a shaft integrally formed therewith was evaluated with respect to the degree of run out, in the following manner. The integral roller-shaft structure was supported, at both 5 terminal shaft portions 1, 1 thereof, by V blocks. A dial gauge was brought into contact with each of portion D (in register with the center of roller 2) and portion E of the roller as shown in FIG. 11 in a manner such that any displacement in a direction perpendicular to the axis of the integral roller-shaft structure can be detected. Portion D is positioned in the middle of the length of roller 2 and portion E is positioned at a distance of 130 mm from end surface 6 to which gate 4 has been communicated. The roller was revolved once on the axis of the integral roller-shaft structure, and the maximum and minimum values of displacement measured by the dial gauge during the revolution were obtained, and a difference between the maximum and minimum values was taken as the degree of run out. That is, the degree of run out of the integral roller-shaft structure was evaluated at portions D and E in substantially the same manner as in Example 1. In a roller, the smaller the degree of run out, the higher the dimensional precision, so that an improved accuracy of operation can be ensured.

Further, the average diameter of roller 2 was measured with respect to a middle portion thereof and an end portion thereof at a side of gate 4. Those average diameters are, respectively, referred to as D1 and D2, and the difference which was obtained by subtracting D2 from D1 was taken as a criterion for evaluating the dimensional precision. The above difference (=D1−D2) is used as a criterion for showing the cylindricality of a roller. That is, the smaller the difference between the diameters of the middle portion and the end portion (at the gate side) of the roller, the higher the dimensional precision, so that an improved accuracy of operation can be ensured.

Results are shown in Tables 6 and 7. In each of Examples 22 to 31, the integral roller-shaft structure had no hesitation mark.

The results show that the integral roller-shaft structure obtained in each of Examples 22 to 31 is low in the degree of run out. The results also show that the integral roller-shaft structures have no hesitation mark, indicating that even a local run out does not occur. Thus, it has been found that the obtained roller has a high dimensional precision and is excellent as a mechanical part. The roller having an R2/r2 ratio of 1 to 3 is especially useful because the difference (=D1−D2) is small.

Examples 32 and 33

In Examples 32 and 33, substantially the same procedure as in Examples 23 and 28 was repeated, except that the auxiliary chamber was not used and that the respective shot volumes of the molten resin were about 65% of those in Examples 23 and 28 so that integral roller-shaft structures to be produced had the same hollow ratios as those in Examples 23 and 28. In each of Examples 32 and 33, the L(b)/L(a) ratio was 0.93.

With respect to the integral roller-shaft structure obtained in each of Examples 32 and 33, a hesitation mark was observed around a portion (corresponding to portion E indicated in FIG. 11) which was positioned at a distance of 130 mm from end surface 6 which was communicated with gate 4. The degree of run out of the roller was evaluated at a portion which was in register with the center thereof (corresponding to portion D indicated in FIG. 11) in substantially the same manner as in Examples 22 to 31. Likewise, the degree of run out was determined at portion E around which a hesitation mark was observed.

Results are shown in Tables 6 and 7.

The results show that the obtained integral roller-shaft structures are low in degree of run out at portion D, although a local, slight run out occurs due to the hesitation mark.

Comparative Examples 12 and 13

In Comparative Examples 12 and 13, substantially the same procedure as in Examples 23 and 28 was repeated, except that the respective shot volumes of the molten resin were the same as those employed in Examples 32 and 33.

The nitrogen gas was introduced into the molten resin mass through the nozzle, sprue, runner and gate, and the nitrogen gas penetrated the molten resin present in the nozzle, sprue, runner and gate, and reached the inside of the auxiliary chamber. However, since the shot volume of the molten resin was small, the molten resin introduced from the cavity to the auxiliary chamber could not fill the auxiliary chamber, so that, in the auxiliary chamber, a hollow, molten resin balloon having nitrogen gas continued to be supplied thereinto was formed, leaving a space therearound in the auxiliary chamber. The wall of the resin balloon was broken under the pressure of the nitrogen gas, so that the introduced gas was released from the hollow of the molten resin mass in the cavity before cooling of the molten resin. Therefore, molding of the resin could not be performed.

Comparative Example 14

Substantially the same procedure as in Example 32 was repeated, except that the shot volume of the molten resin was increased so that the cavity was filled with the resin. As a result, a hollow ratio was decreased to a level as low as 10% or less and a substantial resin thickness became large, so that the cycle time of molding was prolonged about 4 times as long as that in Example 20, leading to a low productivity. The L(b)/L(a) ratio was 0.26.

Examples 34 to 41

Figure 13:
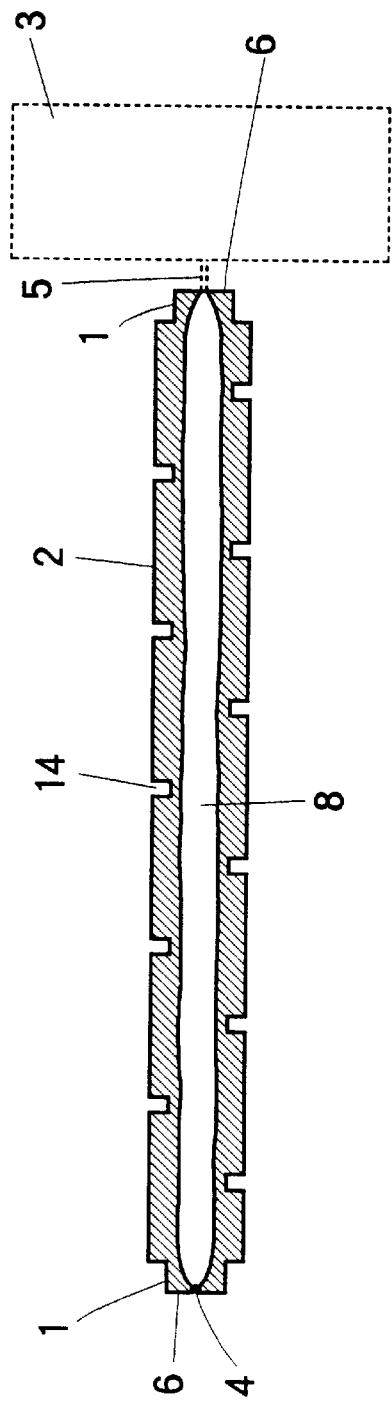
FIG. 13 is a diagrammatic cross-sectional view of the grooved roller of FIG. 12, taken along the line XIII—XIII, shown together with an auxiliary chamber used in the production thereof indicated by a broken line.

In each of Examples 34 to 41, a roller having a groove on a surface thereof was produced. The obtained integral grooved roller-shaft structure has an entire length of 160 mm (wherein each of the terminal shaft portions located at both ends of the structure has a length of 5 mm), and each terminal shaft portion 1 has a diameter of 10 mm. A portion of the roller which has no groove 14 has a diameter of 14 mm, and groove 14 has a width of 2 mm and a depth of 2 to 3.5 mm. The obtained integral grooved roller-shaft structure is shown in FIG. 12. The obtained integral grooved roller-shaft structure has a cross-section as shown in FIG. 13 in which auxiliary chamber 3 used in the production is also shown. Groove 14 was formed in a manner such that two spiral grooves which were inclined at 60 degrees relative to the axis of the roller were arranged to cross each other as shown in FIG. 12.

In Examples 34 to 41, as shown in Tables 8 and 9, an acetal homopolymer, a polyamide (Nylon 66), a modified polyphenylene ether and an ABS resin were used as resins. The hollow injection molding was conducted at an appropriate mold temperature and cylinder temperature selected depending on the type of the resins.

As a hollow-forming fluid to be introduced into a molten resin mass in the cavity of the mold, nitrogen gas was employed. A gas inlet was provided in a nozzle located at the forward end of a cylinder of the molding machine. As shown in FIGS. 12 and 13, gate 4, and path 5 for communicating the cavity with auxiliary chamber 3 were formed in two opposite end walls of the cavity, wherein the two opposite end walls of the cavity correspond to two opposite end surfaces 6, 6 of the integral segment-shaft structure.

The resin was melted in the cylinder of the molding machine and injected into the mold cavity through the nozzle of the cylinder and the gate so as to fill the cavity with a molten resin mass. Subsequently, nitrogen gas, which was supplied through the nozzle of the cylinder, was introduced into the molten resin mass to form a hollow within the molten resin mass. The nitrogen gas employed was one which had previously been pressurized to a pressure of 100 kg/cm$^2$ in an apparatus for supplying a hollow-forming fluid. The nitrogen gas was introduced into the molten resin mass through the nozzle, sprue, runner and gate, and the nitrogen gas penetrated the molten resin present in the nozzle, sprue, runner and gate.

By the introduction of the nitrogen gas as the hollow-forming fluid into the molten resin mass to form hollow 8, a portion of the molten resin mass was caused to be pushed out of the cavity into auxiliary chamber 3. Hollow 8 had a cross-section as shown in FIG. 13. The L(b)/L(a) ratio was 1.00.

In the above hollow injection molding, the introduction of the nitrogen gas under pressure was effected under conditions such that the gas introduction delay time (a time between the completion of the injection of a molten resin and the introduction of the gas into the molten resin mass) was 0.5 second, that the gas introduction time (a time for the introduction of the gas) was 5 seconds, and that the pressure holding time (a total of the gas introduction time and the time for which the gas is held under pressure in the cavity in a closed system, subsequent to stopping the gas introduction) was 41 seconds. 5 seconds after the end of the pressure holding time, the mold was opened and the shaped resin article obtained was released from the mold.

Further, roller 2 was measured with respect to the diameter of a portion which is in register with the center of the roller and the diameter of an end of roller 2 which was on a side of gate 4. The above-mentioned portion and end had no groove on a surface thereof. That is, the diameter of the roller at its portion which is in register with the center thereof was measured at points a, b as indicated in FIG. 12, and the diameter of roller 2 at its end which is on a side of gate 4 is measured at points c, d also as indicated in FIG. 12. Those diameters are, respectively, referred to as D3 and D4, and the difference which was obtained by subtracting D4 from D3 was taken as a criterion for evaluating the dimensional precision. The above difference (=D3−D4) is used as a criterion for showing the cylindricality of the roller. When the cylindricality is poor, the groove on a surface of the roller cannot properly function and cannot precisely transmit the movement of the roller to a pin which is arranged to move reciprocally along the groove as explained in the descriptive portion above. That is, the smaller the difference between the diameter of the roller at its portion which is in register with the center of the roller and the diameter of the end of the roller which is on a side of the gate, the higher the dimensional precision, so that an improved accuracy of operation can be ensured.

Then, the integral grooved roller-shaft structure was examined to find whether or not a hesitation mark was observed.

Results are shown in Tables 8 and 9. With respect to the integral grooved roller-shaft structure obtained in each of Examples 34 to 41, no hesitation mark was observed.

The results show that for the integral grooved roller-shaft structure obtained in each of Examples 34 to 41, a difference in diameter (=D3−D4) is small, so that the grooved roller can accurately transmit the movement thereof to a pin which is arranged to move reciprocally along the groove. Further, since the depth of the groove is not smaller than the width of the groove, the pin in the groove does not almost come out of the groove during the rotation of the roller. Thus, the integral grooved roller-shaft structures are excellent as mechanical parts.

Examples 42 to 45

In Examples 42, 43, 44 and 45, substantially the same procedure as in Examples 34, 36, 38 and 40 was repeated, except that the auxiliary chamber was not used, and the respective shot volume of the molten resin was about 65% of that in Examples 34, 36, 38 and 40 so that the integral roller-shaft structure to be produced had the same hollow ratios as those in the corresponding Examples. In each of Examples 42 to 45, the L(b)/L(a) ratio was 0.94.

In each of Examples 34, 36, 38 and 40, a hesitation mark was observed around a portion which was at a distance of about 105 mm from the end surface to which a gate was communicated, and a concavo-convexo displacement having a depth of 0.2 mm appeared inside of the groove.

A difference in diameter (=D3−D4) was measured in the same manner as in Examples 34 to 41.

Results are shown in Tables 8 and 9.

The results show that the integral grooved roller-shaft structure obtained in each of Examples 42 to 45 had a small difference in diameter (=D3−D4) and a high cylindricality, although a relatively small concavo-convexo displacement appears inside of the groove due to the hesitation mark.

Comparative Examples 15 to 18

In Comparative Examples 15, 16, 17 and 18, substantially the same procedure as in Examples 34, 36, 38 and 40 was repeated, except that the respective shot volumes of the molten resin were the same as those in Examples 42, 43, 44 and 45.

Nitrogen gas as a hollow-forming fluid was introduced into the molten resin mass through the nozzle, sprue, runner and gate, and penetrated the molten resin present in the nozzle, sprue, runner and gate, and reached the inside of the auxiliary chamber. However, since the shot volume of the molten resin was small, the molten resin introduced from the cavity to the auxiliary chamber could not fill the auxiliary chamber, so that, in the auxiliary chamber, a hollow, molten resin balloon having nitrogen gas continued to be supplied thereinto was formed, leaving a space therearound in the auxiliary chamber. The wall of the resin balloon was broken under the pressure of the nitrogen gas, so that the introduced nitrogen gas was released from the hollow of the molten resin mass in the cavity before cooling of the molten resin. Therefore, molding of the resin could not be performed.

Comparative Example 19

Substantially the same procedure as in Example 42 was repeated, except that the shot volume of the molten resin was increased so that the cavity was filled with the molten resin mass by a full shot of the resin. As a result, a hollow ratio was decreased to a level as low as 10% or less and a substantial resin thickness became large, so that the cycle time of molding was prolonged about 4 times as long as that in Example 29, leading to a low productivity. The L(b)/L(a) ratio was 0.20.

TABLE 1(a)

| | Locations of gate and path for communicating cavity with auxiliary chamber | Presence or absence of auxiliary chamber | Resin used | Shot volume of molten resin | Location of inlet for supplying hollow-forming fluid | L(b)/L(a) | Degree of run out (mm) Portion A | Portion B |
|---|---|---|---|---|---|---|---|---|
| Example 1 | FIG. 3 | Present | Acetal copolymer | By full shot method | Nozzle of molding machine | 1.00 | 0.02 | 0.03 |
| Example 2 | FIG. 3 | Present | Acetal copolymer | By full shot method | Nozzle of molding machine | 0.97 | 0.04 | 0.04 |
| Example 3 | FIG. 3 | Present | Acetal copolymer | By full shot method | Nozzle of molding machine | 0.92 | 0.07 | 0.08 |
| Comparative Example 1 | FIG. 3 | Present | Acetal copolymer | By full shot method | Nozzle of molding machine | 0.87 | 0.85 | 0.94 |

TABLE 1(b)

| | Locations of gate and path for communicating cavity with auxiliary chamber | Presence or absence of auxiliary chamber | Resin used | Shot volume of molten resin | Location of inlet for supplying hollow-forming fluid | Degree of run out (mm) Portion A | Portion B | Hesitation mark | Degree of run out at portion C (portion measured for hesitation mark) (mm) |
|---|---|---|---|---|---|---|---|---|---|
| Example 1 | FIG. 3 | Present | Acetal copolymer | By full shot method | Nozzle of molding machine | 0.02 | 0.03 | Not observed | 0.02 |
| Example 4 | FIG. 3 | Present | Acetal copolymer | By full shot method | Runner | 0.02 | 0.02 | Not observed | 0.03 |
| Example 5 | FIG. 3 (no communicating path) | Absent | Acetal copolymer | By short shot method | Nozzle of molding machine | 0.03 | 0.02 | Observed | 0.21 |
| Example 5 | FIG. 7 (no communicating path) | Absent | Acetal copolymer | By short shot method | Cavity wall | 0.04 | 0.04 | Observed | 0.20 |
| Comparative Example 2 | FIG. 1 | Present | Acetal copolymer | By full shot method | Nozzle of molding machine | 1.05 | 1.05 | Not observed | 1.01 |
| Comparative Example 3 | FIG. 2 | Present | Acetal copolymer | By full shot method | Nozzle of molding machine | 1.14 | 1.13 | Not observed | 1.12 |
| Comparative Example 4 | FIG. 3 | Present | Acetal copolymer | By short shot method | Nozzle of molding machine | Molding cannot be conducted | Molding cannot be conducted | Molding cannot be conducted | Molding cannot be conducted |

TABLE 2

| | Locations of gate and path for communicating cavity with auxiliary chamber | Presence or absence of auxiliary chamber | Resin used | Shot volume of molten resin | Location of inlet for supplying hollow-forming fluid | Degree of run out (mm) Portion A | Portion B | Hesitation mark | Degree of run out at portion C (portion measured for hesitation mark) (mm) |
|---|---|---|---|---|---|---|---|---|---|
| Example 7 | FIG. 3 | Present | Nylon 66 | By full shot method | Nozzle of molding machine | 0.03 | 0.01 | Not observed | 0.03 |
| Example 8 | FIG. 3 | Present | Nylon 66 | By full shot method | Runner | 0.02 | 0.01 | Not observed | 0.01 |
| Example 9 | FIG. 3 (no communicating path) | Absent | Nylon 66 | By short shot method | Nozzle of molding machine | 0.03 | 0.03 | Observed | 0.20 |
| Comparative Example 6 | FIG. 1 | Present | Nylon 66 | By full shot method | Nozzle of molding machine | 1.08 | 1.07 | Not observed | 0.99 |
| Comparative Example 7 | FIG. 2 | Present | Nylon 66 | By full shot method | Nozzle portion of molding machine | 1.16 | 1.16 | Not observed | 1.10 |
| Comparative Example 8 | FIG. 3 | Present | Nylon 66 | By short shot method | Nozzle portion of molding machine | Molding cannot be conducted | Molding cannot be conducted | Molding cannot be conducted | Molding cannot be conducted |

TABLE 3

| | Resin used | Presence or absence of recess 18 in which an opening as gate is located | Hollow ratio (%) | Degree of run out at portion A (mm) | Hesitation mark |
|---|---|---|---|---|---|
| Example 10 | Acetal copolymer | Present | 35 | 0.03 | Not observed |
| Example 11 | Nylon 66 | Present | 35 | 0.02 | Not observed |

Note:
An auxiliary chamber was used in each Example shown in Table 3.

TABLE 4

| | | Toothed wheel design | | | | | | Measurement according to JIS B 1702 (unit: μm) | |
|---|---|---|---|---|---|---|---|---|---|
| | Resin used | Diameter of root circle of toothed wheel portion R1 (mm) | Diameter of shaft portion r1 (mm) | R1/r1 | Shot volume of molten resin | Presence or absence of auxiliary chamber | Hesitation mark | Tooth profile error | Lead error |
| Example 12 | Acetal copolymer | 8.5 | 8.0 | 1.06 | By full shot method | Present | Not observed | 6 | 6 |
| Example 13 | Acetal copolymer | 15.5 | 8.0 | 1.94 | By full shot method | Present | Not observed | 6 | 5 |
| Example 14 | Acetal copolymer | 23.5 | 8.0 | 2.94 | By full shot method | Present | Not observed | 7 | 8 |
| Example 15 | Acetal copolymer | 31.5 | 8.0 | 3.94 | By full shot method | Present | Not observed | 7 | 7 |
| Example 16 | Acetal copolymer | 39.5 | 8.0 | 4.94 | By full shot method | Present | Not observed | 11 | 11 |
| Comparative Example 9 | Acetal copolymer | 23.5 | 8.0 | 2.94 | By short shot method | Present | Molding cannot be conducted | Molding cannot be conducted | Molding cannot be conducted |

TABLE 5

| | | Toothed wheel design | | | | | | Measurement according to JIS B 1702 (unit: μm) | |
|---|---|---|---|---|---|---|---|---|---|
| | Resin used | Diameter of root circle of toothed wheel portion R1 (mm) | Diameter of shaft portion r1 (mm) | R1/r1 | Shot volume of molten resin | Presence or absence of auxiliary chamber | Hesitation mark | Tooth profile error | Lead error |
| Example 17 | Nylon 66 | 8.5 | 8.0 | 1.06 | By full shot method | Present | Not observed | 6 | 7 |
| Example 18 | Nylon 66 | 15.5 | 8.0 | 1.94 | By full shot method | Present | Not observed | 6 | 6 |
| Example 19 | Nylon 66 | 23.5 | 8.0 | 2.94 | By full shot method | Present | Not observed | 7 | 8 |
| Example 20 | Nylon 66 | 31.5 | 8.0 | 3.94 | By full shot method | Present | Not observed | 8 | 7 |
| Example 21 | Nylon 66 | 39.5 | 8.0 | 4.94 | By full shot method | Present | Not observed | 11 | 12 |
| Comparative Example 10 | Nylon 66 | 23.5 | 8.0 | 2.94 | By short shot method | Present | Molding cannot be conducted | Molding cannot be conducted | Molding cannot be conducted |

TABLE 6

| | Resin used | Roller Design Diameter of shaft portion r2 (mm) | Roller Design Diameter of roller portion R2 (mm) | R2/r2 | Shot volume of molten resin | Presence or absence of auxiliary chamber | Degree of run out at portion D (mm) | Hesitation mark | Degree of run out at portion E (portion liable to have hesitation mark) (mm) | Difference in average diameter between D1 and D2 (= D1 − D2) (mm) |
|---|---|---|---|---|---|---|---|---|---|---|
| Example 22 | Acetal copolymer | 10 | 10 | 1.0 | By full shot method | Present | 0.01 | Not observed | 0.01 | 0.00 |
| Example 23 | Acetal copolymer | 10 | 15 | 1.5 | By full shot method | Present | 0.02 | Not observed | 0.03 | 0.03 |
| Example 24 | Acetal copolymer | 10 | 20 | 2.0 | By full shot method | Present | 0.03 | Not observed | 0.02 | 0.02 |
| Example 25 | Acetal copolymer | 10 | 30 | 3.0 | By full shot method | Present | 0.02 | Not observed | 0.03 | 0.06 |
| Example 26 | Acetal copolymer | 10 | 40 | 4.0 | By full shot method | Present | 0.05 | Not observed | 0.04 | 0.06 |
| Example 32 | Acetal copolymer | 10 | 15 | 1.5 | By short shot method | Absent | 0.03 | observed | 0.23 | 0.03 |
| Comparative Example 12 | Acetal copolymer | 10 | 15 | 1.5 | By short shot method | Present | Molding cannot be conducted | Molding cannot be conducted | Molding cannot be conducted | Molding cannot be conducted |

TABLE 7

| | Resin used | Roller Design Diameter of shaft portion r2 (mm) | Roller Design Diameter of roller portion R2 (mm) | R2/r2 | Shot volume of molten resin | Presence or absence of auxiliary chamber | Degree of run out at portion D (mm) | Hesitation mark | Degree of run out at portion E (portion Measured for hesitation mark) (mm) | Difference in average diameter between D1 and D2 (= D1 − D2) (mm) |
|---|---|---|---|---|---|---|---|---|---|---|
| Example 27 | Nylon 66 | 10 | 10 | 1.0 | By full shot method | Present | 0.01 | Not observed | 0.02 | 0.01 |
| Example 28 | Nylon 66 | 10 | 15 | 1.5 | By full shot method | Present | 0.03 | Not observed | 0.02 | 0.02 |
| Example 29 | Nylon 66 | 10 | 20 | 2.0 | By full shot method | Present | 0.03 | Not observed | 0.04 | 0.03 |
| Example 30 | Nylon 66 | 10 | 30 | 3.0 | By full shot method | Present | 0.04 | Not observed | 0.03 | 0.06 |
| Example 31 | Nylon 66 | 10 | 40 | 4.0 | By full shot method | Present | 0.04 | Not observed | 0.04 | 0.12 |
| Example 33 | Nylon 66 | 10 | 15 | 1.5 | By short shot method | Absent | 0.04 | observed | 0.22 | 0.04 |
| Comparative Example 13 | Nylon 66 | 10 | 15 | 1.5 | By short shot method | Present | Molding cannot be conducted | Molding cannot be conducted | Molding cannot be conducted | Molding cannot be conducted |

TABLE 8

| | Resin used | Depth of groove (mm) | r3/R3 | Shot volume of molten resin | Hesitation mark | Difference in diameter between middle portion D3 and end portion D4 (= D3 − D4) (mm) |
|---|---|---|---|---|---|---|
| Example 34 | Acetal homopolymer | 2 | 0.714 | By full shot method | Not observed | 0.015 |
| Example 35 | Acetal homopolymer | 3.5 | 0.5 | By full shot method | Not observed | 0.018 |
| Example 42 | Acetal homopolymer | 2 | 0.714 | By short shot method | Observed | 0.016 |
| Example 36 | Nylon 66 | 2 | 0.714 | By full shot method | Not observed | 0.013 |
| Example 37 | Nylon 66 | 3.5 | 0.5 | By full shot method | Not observed | 0.017 |

TABLE 8-continued

|  | Resin used | Depth of groove (mm) | r3/R3 | Shot volume of molten resin | Hesitation mark | Difference in diameter between middle portion D3 and end portion D4 (= D3 − D4) (mm) |
|---|---|---|---|---|---|---|
| Example 43 | Nylon 66 | 2 | 0.714 | By short shot method | Observed | 0.015 |

TABLE 9

|  | Resin used | Depth of groove (mm) | r3/R3 | Shot volume of molten resin | Hesitation mark | Difference in diameter between middle portion D3 and end portion D4 (= D3 − D4) (mm) |
|---|---|---|---|---|---|---|
| Example 38 | Modified polyphenylene ether | 2 | 0.714 | By full shot method | Not observed | 0.008 |
| Example 39 | Modified polyphenylene ether | 3.5 | 0.5 | By full shot method | Not observed | 0.012 |
| Example 44 | Modified polyphenylene ether | 2 | 0.714 | By short shot method | Observed | 0.009 |
| Example 40 | ABS resin | 2 | 0.714 | By full shot method | Not observed | 0.009 |
| Example 41 | ABS resin | 3.5 | 0.5 | By full shot method | Not observed | 0.014 |
| Example 45 | ABS resin | 2 | 0.714 | By short shot method | Observed | 0.011 |

INDUSTRIAL APPLICABILITY

As described above, the present invention provides a mechanical part having a shaft integrally formed therewith which has a high dimensional precision. The mechanical part of the present invention can be produced by a hollow injection molding method. Therefore, the mechanical part can be produced in a short period of time with high productivity. Further, since the mechanical part has a resin shaft integrally formed therewith, it has excellent material-recycling characteristics, thereby contributing to environmental protection, as compared to a mechanical part having a shaft unitarily formed therewith produced by an insert molding method.

The mechanical part according to the present invention, which has excellent properties as described above, is useful in various fields, such as automobiles, ordinary machinery, precision machinery and electric and electronic equipment, so that it is commercially very advantageous. The mechanical part of the present invention is especially useful in household electric appliances and office automation machines, such as facsimile machines, printers and copy machines.

We claim:

1. A hollow, resin mechanical part having a shaft integrally formed therewith, comprising a hollow, integral, functional segment-shaft structure, said hollow, integral, functional segment-shaft structure comprising at least one functional resin segment, and a resin shaft coaxially, integrally formed with said functional segment, said hollow, integral, functional segment-shaft structure having a hollow continuously or discontinuously extending substantially along an axis of said segment-shaft structure within at least one member selected from said functional segment and said shaft, said hollow, integral, functional segment-shaft structure having, in an outer surface thereof, one or two openings communicating with said hollow, wherein said hollow, integral, functional segment-shaft structure satisfies the relationships defined by the following formula (1):

$$0.9 \leq L(b)/L(a) \leq 1 \tag{1}$$

wherein L(a) represents the entire length of said integral segment-shaft structure as measured along the axis thereof, and L(b) represents the length of said hollow as measured along the axis of said integral segment-shaft structure, said hollow, integral, functional segment-shaft structure being adapted to be supported by bearing means at said shaft and revolved on the axis of said shaft to thereby exert a function of said functional segment.

2. The mechanical part according to claim 1, wherein said integral segment-shaft structure has, in an outer surface thereof, two openings communicating with said hollow, and said two openings are, respectively, located in two opposite end surfaces of said integral segment-shaft structure, said two opposite end surfaces being separated by a distance equal to the length of said axis of the integral segment-shaft structure, and wherein said integral segment-shaft structure satisfies the relationships defined by the formula L(b)/L(a) =1 wherein L(a) and L(b) are as defined for formula (1).

3. The mechanical part according to claim 1, wherein said integral segment-shaft structure has, in an outer surface thereof, two openings communicating with said hollow, and wherein one of said two openings is located in one of two opposite end surfaces of said integral segment-shaft structure, said two opposite end surfaces being separated by a distance equal to the length of said axis of the integral segment-shaft structure, and the other opening is located in a recess formed in an outer surface portion other than said two opposite end surfaces, said recess being concaved in a direction from said outer surface portion toward the axis of the integral segment-shaft structure.

4. The mechanical part according to claim 1, wherein at least a part of said functional segment constitutes a toothed wheel.

5. The mechanical part according to claim 1, wherein at least a part of said functional segment constitutes a toothed wheel coaxially formed with said shaft, and wherein said toothed wheel satisfies the relationships represented by the formula R1/r1=1 to 5, in which R1 represents the diameter of the root circle of said toothed wheel and r1 represents the diameter of said shaft.

6. The mechanical part according to claim 1, wherein at least a part of said functional segment constitutes a roller.

7. The mechanical part according to claim 1, wherein at least a part of said functional segment constitutes a roller coaxially formed with said shaft, and wherein said roller satisfies the relationships represented by the formula R2/r2=1 to 4, in which R2 represents the diameter of said roller and r2 represents the diameter of said shaft.

8. The mechanical part according to claim 1, wherein at least a part of said functional segment constitutes a roller coaxially formed with said shaft, wherein said roller has on a surface thereof a groove having a depth of not smaller than a width of the groove, and wherein said roller satisfies the relationships represented by the formula $r3/R3 \geq 0.5$, in which r3 represents the distance between the inner bottom of said groove and the axis of the integral segment-shaft structure, and R3 represents the radius of the circular cross section of the roller at a portion thereof having no groove.

9. A method for injection molding a resin while forming a hollow to produce a hollow, resin mechanical part having a shaft integrally formed therewith, comprising a hollow, integral, functional segment-shaft structure, said hollow, integral, functional segment-shaft structure comprising at least one functional resin segment, and a resin shaft coaxially, integrally formed with said functional segment, said hollow, integral, functional segment-shaft structure having a hollow continuously or discontinuously extending substantially alone an axis of said segment-shaft structure within at least one member selected from said functional segment and said shaft, and having, in an outer surface thereof, one or two openings communicating with said hollow, said hollow, integral, functional segment-shaft structure being adapted to be supported by bearing means at said shaft and revolved on the axis of said shaft to thereby exert a function of said functional segment, which method comprises:

(1) providing a mold comprising a fixed mold half and a movable mold half mating with said fixed mold half to thereby provide a mold cavity defined by an inner wall surface of the fixed mold half and an inner wall surface of the movable mold half, said mold cavity being communicated with a gate, (2) injecting a resin in a molten form into said cavity through said gate to form a molten resin mass in said cavity, and (3) introducing a hollow-forming fluid under pressure into the molten resin mass through a gate for said mold cavity to form a hollow within said molten resin mass, wherein said gate is located in register with a position within a terminal region of said cavity which region has a length such that said hollow, integral segment-shaft structure to be produced satisfies the relationships defined by the following formula (1):

$$0.9 \leq L(b)/L(a) \leq 1 \qquad (1)$$

wherein L(a) represents the entire length of said integral segment-shaft structure as measured along the axis thereof, and L(b) represents the length of said hollow as measured along the axis of said integral segment-shaft structure.

10. The method according to claim 9, wherein said mold has an auxiliary chamber communicated with said mold cavity, and wherein, in step (2), the molten resin is injected so as to fill said cavity and, in step (3), the introduction of said hollow-forming fluid into the molten resin mass is conducted while causing a portion of said resin mass to be pushed out of said cavity into said auxiliary chamber under the pressure of the introduced hollow-forming fluid.

11. The method according to claim 10, wherein said auxiliary chamber is communicated with said mold cavity through an opening formed in one of two opposite end walls of said cavity, said two opposite end walls being separated by a distance equal to the length of an axis of said cavity which axis corresponds to the axis of the integral segment-shaft structure to be produced, said one end wall being positioned on a side remote from said gate.

12. The method according to claim 9 or 10, wherein a protrusion is formed in a wall of the mold defining said cavity, said protrusion corresponding to a recess which is to be formed in the integral segment-shaft structure at its outer surface portion other than two opposite end surfaces separated by a distance equal to the length of the axis of the integral segment-shaft structure to be produced and which is to be concaved in a direction from said outer surface portion toward the axis of said integral segment-shaft structure, and wherein said gate is located in said protrusion in the wall defining the cavity and directed so that said molten resin is injected into said cavity in a direction perpendicular to an axis of said cavity which axis corresponds to the axis of said integral segment-shaft structure to be produced.

13. The method according to claim 9 or 10, wherein said cavity has an internal morphology adapted for producing a hollow, integral, functional segment-shaft structure in which at least a part of said functional segment constitutes a toothed wheel.

14. The method according to claim 9 or 10, wherein said cavity has an internal morphology adapted for producing a hollow, integral, functional segment-shaft structure in which at least a part of said functional segment constitutes a toothed wheel coaxially formed with said shaft, wherein said toothed wheel satisfies the relationships represented by the formula R1/r1=1 to 5, in which R1 represents the diameter of the root circle of said toothed wheel and r1 represents the diameter of said shaft.

15. The method according to claim 9 or 10, wherein said cavity has an internal morphology adapted for producing a hollow, integral, functional segment-shaft structure in which at least a part of said functional segment constitutes a roller.

16. The method according to claim 9 or 10, wherein said cavity has an internal morphology adapted for producing a hollow, integral, functional segment-shaft structure in which at least a part of said functional segment constitutes a roller coaxially formed with said shaft, wherein said roller satisfies the relationships represented by the formula R2/r2=1 to 4, in which R2 represents the diameter of said roller and r2 represents the diameter of said shaft.

17. The method according to claim 9 or 10, wherein said cavity has an internal morphology adapted for producing a hollow, integral, functional segment-shaft structure in which at least a part of said functional segment constitutes a roller coaxially formed with said shaft, wherein said roller has on a surface thereof a groove having a depth of not smaller than a width of the groove, and wherein said roller satisfies the relationships represented by the formula $r3/R3 \geq 0.5$, in which r3 represents the distance between the inner bottom of said groove and the axis of the integral segment-shaft structure, and R3 represents the radius of the circular cross section of the roller at a portion thereof having no groove.

18. The method according to any one of claims 9 to 11, wherein said length of said terminal region of the cavity is $\frac{1}{10}$ of the entire length of said integral functional segment-shaft structure.

19. The method according to claim 12, wherein said length of said terminal region of the cavity is $\frac{1}{10}$ of the entire length of said integral functional segment-shaft structure.

20. The method according to claim 13, wherein said length of said terminal region of the cavity is $\frac{1}{10}$ of the entire length of said integral functional segment-shaft structure.

21. The method according to claim 14, wherein said length of said terminal region of the cavity is $\frac{1}{10}$ of the entire length of said integral functional segment-shaft structure.

22. The method according to claim 15, wherein said length of said terminal region of the cavity is $\frac{1}{10}$ of the entire length of said integral functional segment-shaft structure.

23. The method according to claim 16, wherein said length of said terminal region of the cavity is $\frac{1}{10}$ of the entire length of said integral functional segment-shaft structure.

24. The method according to claim 17, wherein said length of said terminal region of the cavity is $\frac{1}{10}$ of the entire length of said integral functional segment-shaft structure.

\* \* \* \* \*